US009148867B2

(12) United States Patent
Nakata et al.

(10) Patent No.: US 9,148,867 B2
(45) Date of Patent: Sep. 29, 2015

(54) WIRELESS COMMUNICATION APPARATUS AND WIRELESS POSITIONING SYSTEM

(71) Applicant: DENSO CORPORATION, Kariya, Aichi-pref. (JP)

(72) Inventors: Tsuneo Nakata, Kariya (JP); Shigeki Kawai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 13/896,620

(22) Filed: May 17, 2013

(65) Prior Publication Data
US 2013/0310067 A1 Nov. 21, 2013

(30) Foreign Application Priority Data

May 18, 2012 (JP) .................................. 2012-114856
Feb. 14, 2013 (JP) .................................. 2013-026586

(51) Int. Cl.
*H04W 24/00* (2009.01)
*H04W 64/00* (2009.01)
*G01S 7/00* (2006.01)
*G01S 11/06* (2006.01)
*G01S 13/93* (2006.01)
*G08G 1/01* (2006.01)

(52) U.S. Cl.
CPC ............... *H04W 64/00* (2013.01); *G01S 7/003* (2013.01); *G01S 11/06* (2013.01); *G01S 13/931* (2013.01); *G08G 1/0112* (2013.01); *G08G 1/0133* (2013.01); *G01S 2013/936* (2013.01)

(58) Field of Classification Search
CPC ........................... H04W 64/00; H04W 64/003
USPC .......... 455/456.1, 450, 457, 418–422.1, 436; 370/328, 338, 331
See application file for complete search history.

(56) References Cited

U.S. PATENT DOCUMENTS

2003/0235165 A1* 12/2003 Wang ............................. 370/331
2005/0226196 A1* 10/2005 Suh .............................. 370/338
(Continued)

FOREIGN PATENT DOCUMENTS

| JP | H08-33036 A | 2/1996 |
| JP | 2008-039688 A | 2/2008 |
| JP | 2008104029 A | 5/2008 |

(Continued)

OTHER PUBLICATIONS

Office Action mailed Jun. 10, 2014 issued in corresponding JP patent application No. 2013-026586 (and English translation).

*Primary Examiner* — Babar Sarwar
(74) *Attorney, Agent, or Firm* — Posz Law Group, PLC

(57) ABSTRACT

In a wireless communication apparatus, data transmitted from at least one wireless transmitter is received by direct wireless communication, and its wireless reception condition is detected. Relation reference information setting two or more relations between the wireless reception condition on a reception of transmitted data and location information of the transmitter is stored. Relative distance information of a relative distance between the transmitter and the apparatus is measured. Relation information indicating a relation between the wireless reception conditions and the relative distance information is generated. A relation between the location information and the relative distance information is determined by comparing the relation reference information and the relation information. A current location of the apparatus is determined on the basis of the relation between the location information and the relative distance information and a current wireless reception condition.

20 Claims, 29 Drawing Sheets

(56) References Cited

U.S. PATENT DOCUMENTS

2009/0042582 A1* 2/2009 Wang et al. .................. 455/450
2010/0317390 A1 12/2010 Rekimoto

FOREIGN PATENT DOCUMENTS

| JP | 2008233017 A | 10/2008 |
| JP | 2010-231274 A | 10/2010 |

* cited by examiner

WIRELESS COMMUNICATION APPARATUS AND WIRELESS POSITIONING SYSTEM

CROSS-REFERENCE TO RELATED APPLICATION

This application is based on and claims the benefit of priorities from earlier Japanese Patent Application No. 2012-114856 filed May 18, 2012 and Japanese Patent Application No. 2013-026586 filed Feb. 14, 2013, the descriptions of which are incorporated herein by reference.

BACKGROUND

1. Technical Field

The present invention relates to a wireless communication apparatus and a wireless positioning system, which perform positioning through wireless communication.

2. Related Art

GPS (global positioning system) is well known as a wide-area position information service. However, GPS suffers from a problem that, within buildings or behind doors, position information services are not available. Further, GPS, which relies on GPS satellite infrastructure, also suffers from a problem that infrastructure failure or service outage will disable use of the position information services.

Wireless LAN (local area network) positioning technique has been used for some time, which enables positioning not relying on a GPS satellite but using electrical measurement information of widespread wireless LAN. However, in the wireless LAN positioning technique, the positioning accuracy depends on the number of base stations that can receive signals and specify positions. Therefore, the wireless LAN positioning technique suffers from a problem of the cost of building the base stations involved in spreading the technique in a wide area.

In order to solve the problems as set forth above, infrastructure that makes it possible to provide wide-area position information services not relying on a GPS satellite has started to build (see, for example, JP-A-2008-104029). In this infrastructure, the information of detecting wireless LAN stations that are used for communication is aggregated in the cloud for cloud computing using computing resources provided as a service over a network. Then, the LAN stations can be used as base stations for position detection, thereby reducing the cost of building base stations. Thus, wide-area position information services not relying on a GPS satellite becomes available.

However, the technique of aggregating in cloud the information of detecting wireless LAN base stations as disclosed in JP-A-2008-104029 also suffers from a problem that the positioning accuracy greatly depends on the density of the registered base stations.

SUMMARY

The present invention provides a technique that enables positioning without relying on the density of the surrounding base stations.

According to a first aspect of the present disclosure, there is provided a wireless communication apparatus, including: wireless communicating means for receiving data transmitted from at least one wireless transmitter by direct wireless communication, the at least one wireless transmitter transmitting data in a wireless manner; detecting means for detecting wireless reception condition in the wireless communicating means; reference information storing means for storing relation reference information (relation reference information) that sets two or more relations between (i) the wireless reception condition in the wireless communicating means on a reception condition of data transmitted from the wireless transmitter and (ii) location information (location related information) relating to a location of the wireless transmitter; distance measuring means for measuring relative distance information (relative distance related information) relating to a relative distance between the wireless transmitter and the wireless communication apparatus: first generating means for generating first relation information (first relation measurement information) indicating a relation between a plurality of the wireless reception conditions detected by the detecting means and a plurality of the relative distance information measured by the distance measuring means; relation determining means for determining a relation between the location information and the relative distance information by comparing the relation reference information and the first relation information; and position determining means for determining a current location of the wireless communication apparatus on the basis of (a) the relation between the location information and the relative distance information determined by the relation determining means and (b) a current wireless reception condition in the wireless communicating means detected by the detecting means.

The wireless communication apparatus configured in this way is able to perform direct wireless communication with one radio transmitter related to the relation reference information, thereby determining the current location of the wireless communication apparatus. Thus, positioning can be performed irrespective of the density of radio transmitters that are present around the wireless communication apparatus.

In the wireless communication apparatus, the wireless transmitter may be provided to be fixed to a predetermined installation position. The location information in the relation reference information may be information indicating a position on a road laid around the wireless transmitter. The relative distance information in the first relation information may be a travel distance (movement distance) of a vehicle provided with the wireless communication apparatus that moves on the road laid around the wireless transmitter.

When the wireless communication apparatus configured in this way moves on a road, the apparatus is able to perform direct wireless communication with one radio transmitter related to the relation reference information to thereby determine the location of the wireless communication apparatus on the road. This is because the radio transmitter is provided being fixed to a predetermined installation position. Accordingly, the apparatus is able to determine relation information (i.e., relation reference information) between wireless reception condition from the radio transmitter and the information that indicates the position on the road that is laid around the radio transmitter. It should be appreciated that "the current location in the wireless communication apparatus" set forth above corresponds to the "current location on the road in the wireless communication apparatus".

In the wireless communication apparatus, the wireless transmitter may be mounted in a first moving object that moves on a road. The location information in the relation reference information may be information indicating a relative distance between the first moving object and the wireless communication apparatus. The relative distance information in the first relation information may be information indicating an increase and decrease in a relative distance between the first moving object and the wireless communication apparatus with respect to a reference relative distance that is a relative distance between the first moving object and the wireless communication apparatus at a predetermined time point.

When the wireless communication apparatus configured in this way moves near the first moving object, the apparatus is able to perform direct wireless communication with one radio transmitter (i.e. the radio transmitter installed in the first moving object) related to the relation reference information to thereby determine a relative distance between the first moving object and the wireless communication apparatus. It should be appreciated that, in this case, the "current location in the wireless communication apparatus" is the "current location with reference to the first moving object" and thus corresponds to the "relative distance between the first moving object and the wireless communication apparatus".

According to a second aspect of the present disclosure, there is provided a wireless positioning system, including: the wireless transmitter as described above and the wireless communication apparatus as described above. The wireless positioning system configured in this way includes the wireless communication apparatus recited in claim 1 and thus can exert effects similar to those of the wireless communication apparatus recited in claim 1.

DESCRIPTION OF EMBODIMENTS

With reference to the accompanying drawings, hereinafter are described several exemplary embodiments of the present invention.

First Exemplary Embodiment

First, a first exemplary embodiment of the present invention is described with reference to FIGS. 1 to 9.

Figure 1:
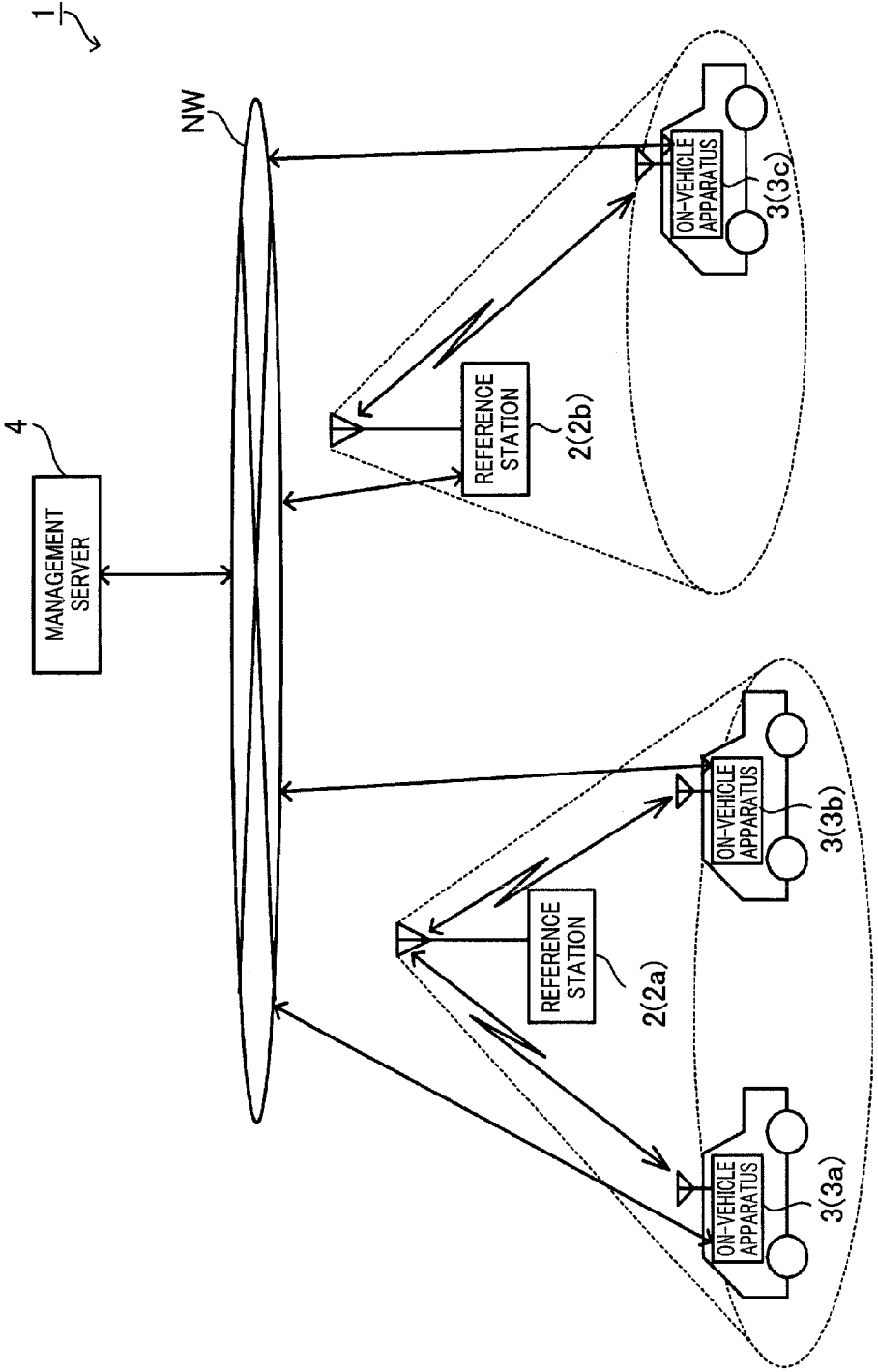
FIG. 1 is a diagram illustrating a configuration of a wireless positioning system according to a first embodiment of the present invention.

FIG. 1 is a diagram illustrating a configuration of a wireless positioning system 1 according to the first embodiment. As shown in FIG. 1, the wireless positioning system 1 of the present embodiment includes a plurality of reference stations 2 (two reference stations 2a and 2b are shown in FIG. 1), on-vehicle apparatuses 3 (three on-vehicle apparatuses 3a, 3b and 3c are shown in FIG. 1) and a management server 4. The reference stations 2 are arranged being scattered in an out-of-service area of GPS (global positioning system) to perform direct wireless communication. The on-vehicle apparatuses 3 are each installed in a motorcar to perform direct wireless communication. The management server 4 manages data for measuring the position of each on-vehicle apparatus 3.

The reference station 2 periodically transmits a radio beacon including identification information of the reference station 2 to the motorcars around it, using a direct wireless communication function. Of the plurality of reference stations 2a, 2b and 2c, some (the reference station 2b in FIG. 1) are configured to perform data communication with the management server 4 via a wide-area wireless communication network NW (e.g., mobile phone communication network).

Figure 2:
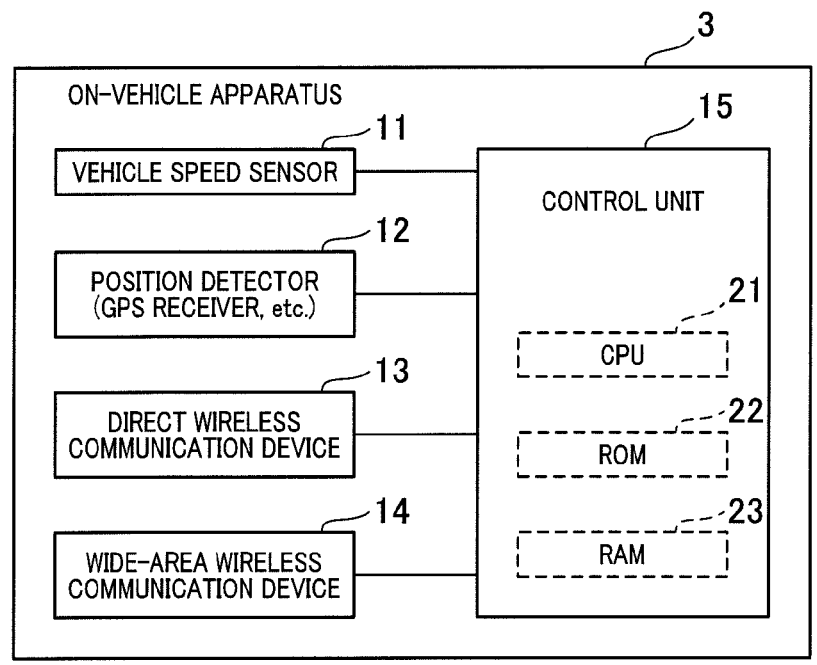
FIG. 2 is a block diagram illustrating a configuration of an on-vehicle apparatus in the wireless positioning system of FIG. 1.

As shown in FIG. 2, the on-vehicle apparatus 3 includes a vehicle speed sensor 11, a position detector 12, a direct wireless communication device 13, wide-area wireless communication device 14 and a control unit 15.

Of these components, the vehicle speed sensor 11 detects the speed of the vehicle that installs the vehicle sensor 11. The detection results of the vehicle speed sensor 11 are inputted to the control unit 15.

The position detector 12 is configured by a GPS receiver and a plurality of sensors. The GPS receiver receives a satellite signal transmitted from a GPS satellite. The plurality of sensors include, for example, a distance sensor that detects a travel distance (movement distance) of the vehicle that installs the on-vehicle apparatus 3 (hereinafter referred to as "the own vehicle") on the basis of the rotation of the own vehicle, and an azimuth sensor. Based on the signals obtained from these sensors, the position detector 12 detects the position and the travelling direction of the own vehicle. The detection results of the position detector 12 are inputted to the control unit 15.

The direct wireless communication device 13 performs direct wireless communication with the reference station 2.

The wide-area wireless communication device 14 performs data communication with the management server 4 via the wide-area wireless communication network NW.

The control unit 15 includes a central processing unit (CPU) 21, a read-only memory (ROM) 22 and a random access memory (RAM) 23 and controls the communication devices 13 and 14 by allowing the CPU 21 to perform a process based on a program which is stored in the ROM 22.

Figure 3:
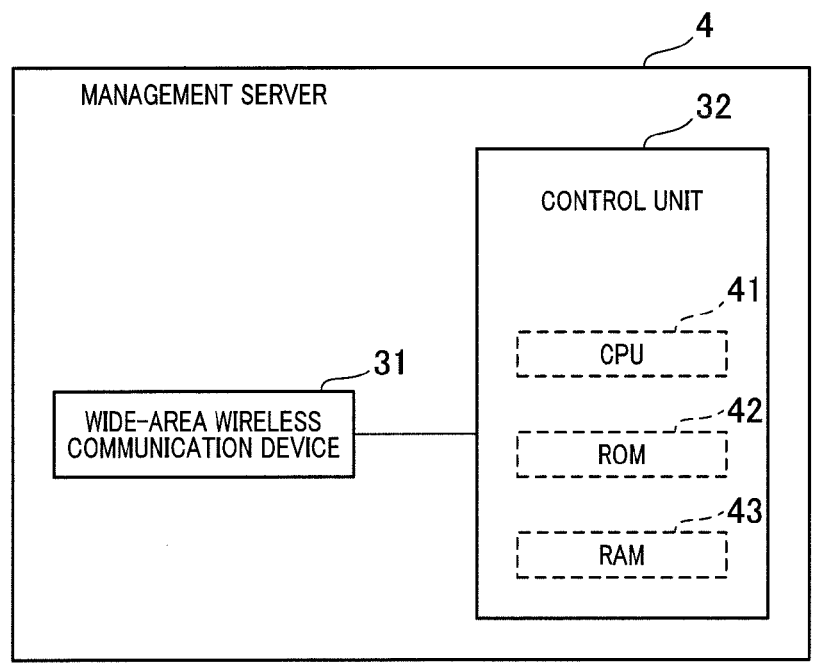
FIG. 3 is a block diagram illustrating a configuration of a management server in the wireless positioning system of FIG. 1.

As shown in FIG. 3, the management server 4 includes a wide-area wireless communication device 31 and a control unit 32. Of these components, the wide-area wireless communication device 31 communicates with the reference station 2 and the on-vehicle apparatus 3 via the wide-area wireless communication network NW. The control unit 32 includes a CPU 41, a ROM 42 and a RAM 43 and controls the wide-area wireless communication device 31 by allowing the CPU 41 to perform a process based on a program which is stored in the ROM 42. The RAM 43 of the control unit 32 stores reference trajectory information (described later) regarding the plurality of reference stations 2.

In the wireless positioning system 1 configured as described above, the on-vehicle apparatus 3 performs a position estimation process that will be described later. The management server 4 performs a trajectory update process that will be described later.

Figure 4:
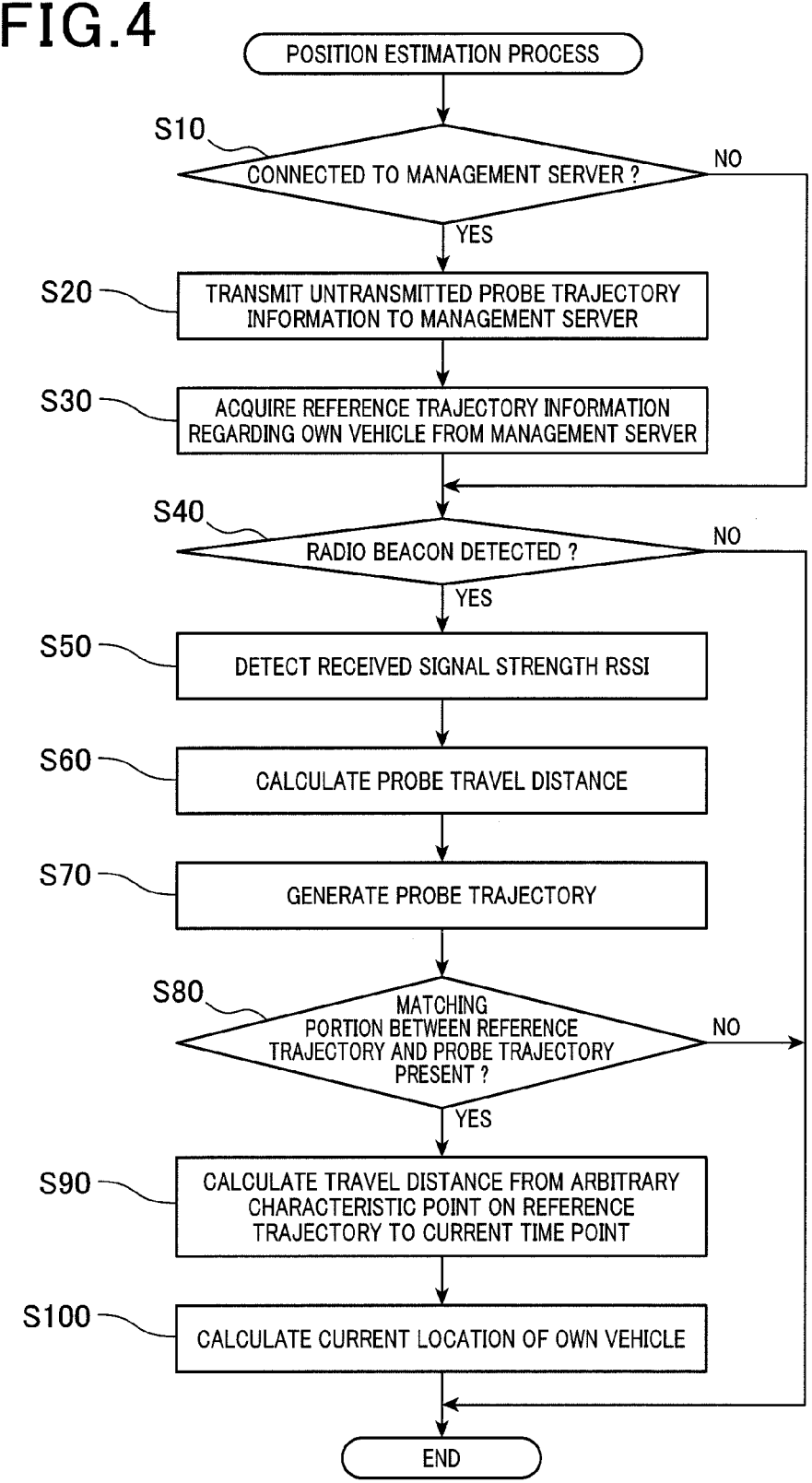
FIG. 4 is a flow diagram illustrating a position estimation process, according to the first embodiment.

First, referring to FIG. 4, hereinafter are described steps of the position estimation process performed by the CPU 21 of the on-vehicle apparatus 3. The position estimation process is repeatedly performed while the CPU 21 is activated.

When the position estimation process is performed, the CPU 21 determines, first, at step S10, whether or not connection is established with the management server 4 so that the wide-area wireless communication device 14 can communicate with the management server 4. If no connection is established with the management server 4 (NO at step S10), control proceeds to step S40. On the other hand, if connection is established with the management server 4 (YES at step S10), control proceeds to step S20.

At step S20, if there is a probe trajectory (described later) that has not been transmitted to the management server 4, the CPU 21 transmits probe trajectory information indicating the untransmitted probe trajectory to the management server 4, together with the identification information of the reference station 2 and the information indicating the type of the own vehicle, travelling direction (described later) and current time.

Then, at step S30, the CPU 21 acquires reference trajectory information from the management server 4. The reference trajectory information indicates a reference trajectory of the reference station 2 which is present within a predetermined distance (e.g., 1 km in the present embodiment) from the current location, in the vicinity of the road on which the vehicle (own vehicle) provided with the on-vehicle apparatus 3 travels.

The acquired reference trajectory information is stored in the RAM 23, and control proceeds to step S40. The reference trajectory information of the reference station 2 is provided for each vehicle type and for each travelling direction (see FIG. 6). The travelling direction is used here for distinguishing travelling on an inbound lane and traveling on an outbound lane of the road.

Of a plurality of pieces of reference trajectory information regarding the reference stations 2, the CPU 21 of the on-vehicle apparatus 3 acquires only the reference trajectory information regarding the vehicle type of the own vehicle and the travelling direction of the own vehicle from the management server 4. However, if the reference trajectory information of the reference station 2 has been acquired in the past and the reference trajectory information has not been updated since the previous acquisition, no reference trajectory information is acquired.

Figure 5:
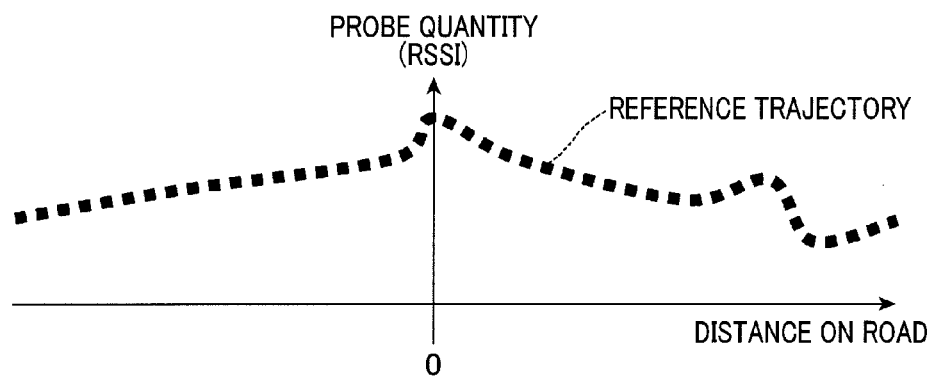
FIG. 5 is a diagram illustrating a reference trajectory.
Figure 6:
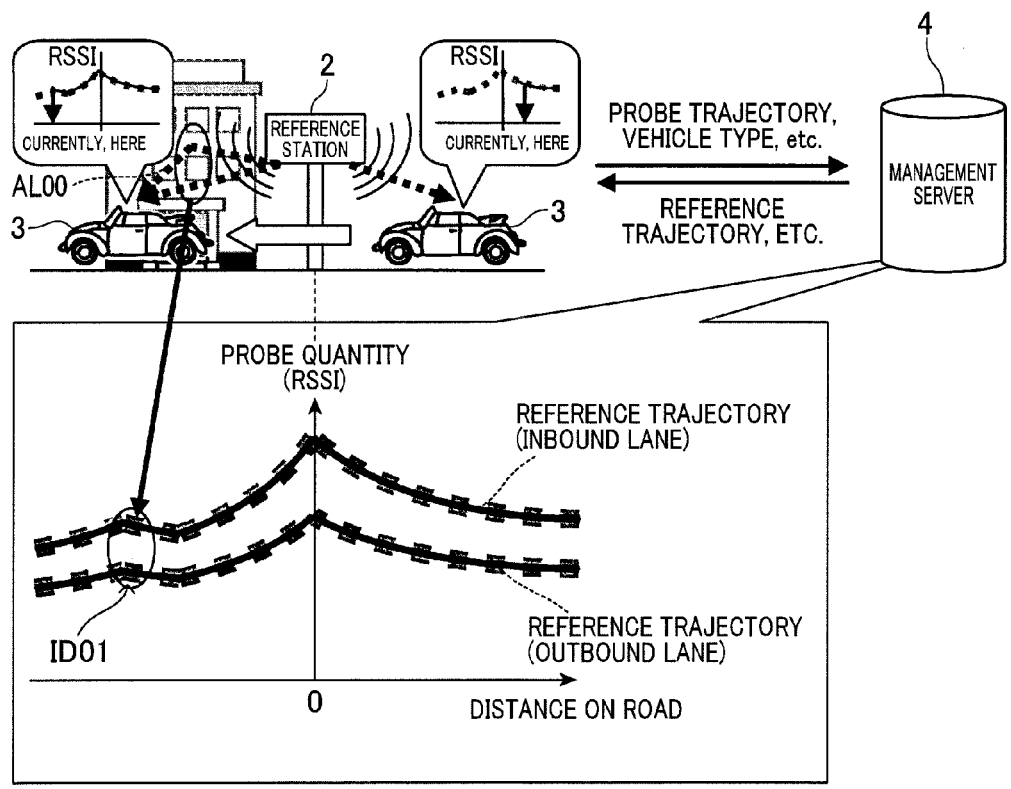
FIG. 6 is a diagram illustrating reference trajectories of inbound and outbound lanes.

The reference trajectory indicates a relation between travel distance and probe quantity (see FIG. 5). The travel distance refers to a distance that the own vehicle has traveled on the road in the vicinity of the reference station 2 from a point nearest to the reference station 2 as a base point (hereinafter referred to as a reference travel distance).

The probe quantity is associated with the reference station 2 (in the present embodiment, the probe quantity refers to a received signal strength RSSI (received signal strength indicator) of a radio signal that the on-vehicle apparatus 3 has received from the reference station 2). The probe quantity is maximized at a point nearest from the reference station 2 on the road, in the vicinity of the reference station 2.

In the reference trajectory, the probe quantity does not necessarily gradually decrease as the own vehicle travels away from the point nearest to the reference station 2. The reference trajectory may have a local maximal point (see the command ID01 of FIG. 6) reflecting the reflection or diffraction caused by a nearby building (see the arrow AL00).

When control proceeds to step S40, the CPU 21 determines whether or not a radio beacon has been detected. If no radio beacon has been detected (NO at step S40), this iteration of the position estimation process is ended. On the other hand, if a radio beacon has been detected (YES at step S40), control proceeds to step S50. At step S50, the CPU 21 detects a probe quantity (the received signal strength RSSI in the present embodiment) of the detected radio beacon.

At the same time, at step S60, the CPU 21 calculates a travel distance of the own vehicle from the time point when the radio beacon has initially been detected (hereinafter is referred to a probe travel distance). Then, at step S70, a probe trajectory (see FIG. 7) is generated, which indicates a relation between probe quantity and probe travel distance from the time point when the radio beacon has initially been detected to the current time point.

Then, at step S80, the probe trajectory generated at step S70 is superimposed over the reference trajectory which is indicated by the reference trajectory information acquired at step S30 (see FIG. 7) to determine whether or not there is a matching portion therebetween, with a degree of matching equal to or more than a predetermined trajectory matching threshold.

If there is not a matching portion with a degree of matching equal to or more than the trajectory matching threshold (NO at step S80), the position estimation process is once ended. On the other hand, if there is a matching portion with a degree of matching equal to or more than the trajectory matching threshold (YES at step S80), control proceeds to step S90.

Figure 7:
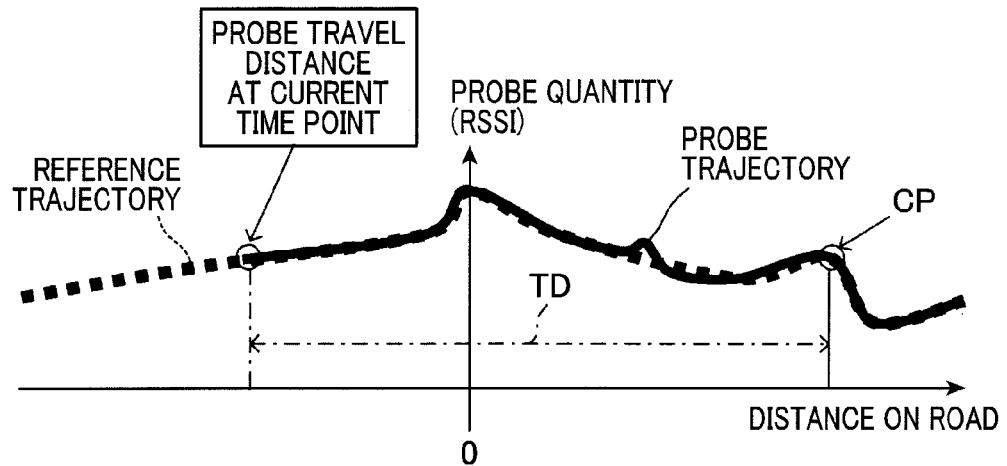
FIG. 7 is an explanatory diagram illustrating a position determination method using a reference trajectory and a probe trajectory.

At step S90, the CPU 21 calculates a travel distance TD from an arbitrary characteristic point CP on the reference trajectory to the current time point (see FIG. 7). The characteristic point CP corresponds, for example, to a maximal, minimal, local maximal or local minimal point of the probe quantity.

Then, at step S100, the CPU 21 calculates a current location of the own vehicle on the road the own vehicle travels, on the basis of the travel distance TD from the characteristic point CP to the current time point. Then, the position estimation process is once ended.

Figure 8:
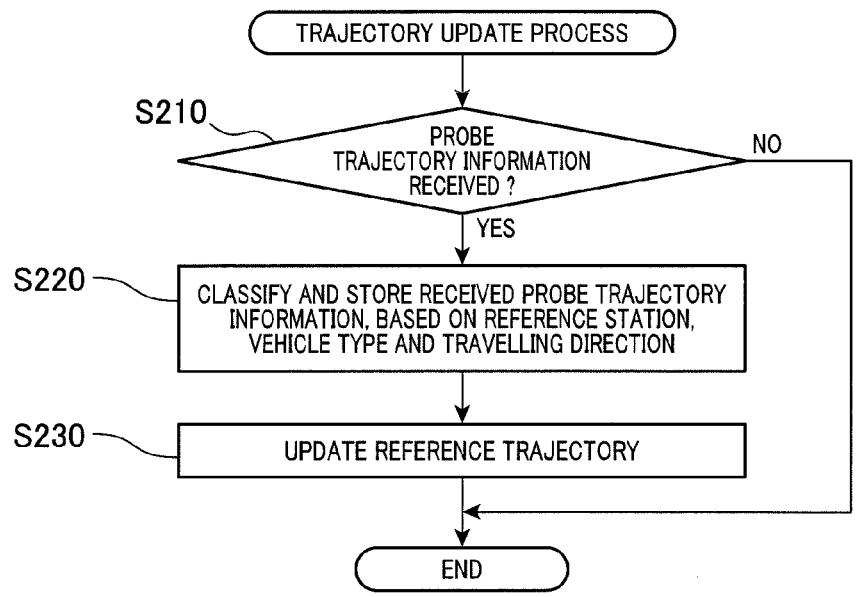
FIG. 8 is a flow diagram illustrating a trajectory update process, according to the first embodiment.

Referring now to FIG. 8, hereinafter are described steps of the trajectory update process performed by the CPU 41 of the management server 4. The trajectory update process is repeatedly performed while the CPU 41 is activated.

When the trajectory update process is performed, the CPU 41 determines, first, at step S210, whether or not probe trajectory information has been received from the on-vehicle apparatus 3. If no probe trajectory information has been received (NO at step S210), the trajectory update process is once ended. On the other hand, if probe trajectory information has been received (YES at step S210), control proceeds to step S220.

At step S220, the received probe trajectory information is classified and stored on the basis of the identification information of the reference station 2, the vehicle type of the vehicle that installs the on-vehicle apparatus 3, and the travelling direction of the vehicle (travelling direction in the inbound lane, or travelling direction in the outbound lane).

Then, at step S230, the reference trajectory having the same reference station, vehicle type and travelling direction as those of the probe trajectory information added at step S220 is updated using the probe trajectory added at step S220. Then, the trajectory update process is once ended.

Specifically, in the present embodiment, for example, the probe trajectories stored up to then are classified on the basis of the same reference station, the same vehicle type and the same travelling direction. Then, an average value is calculated for the probe trajectories of each classification and the average value is used as a reference trajectory. However, an average value is calculated after removing those probe trajectories which have a variance equal to or more than a predetermined removal threshold.

Figure 9:
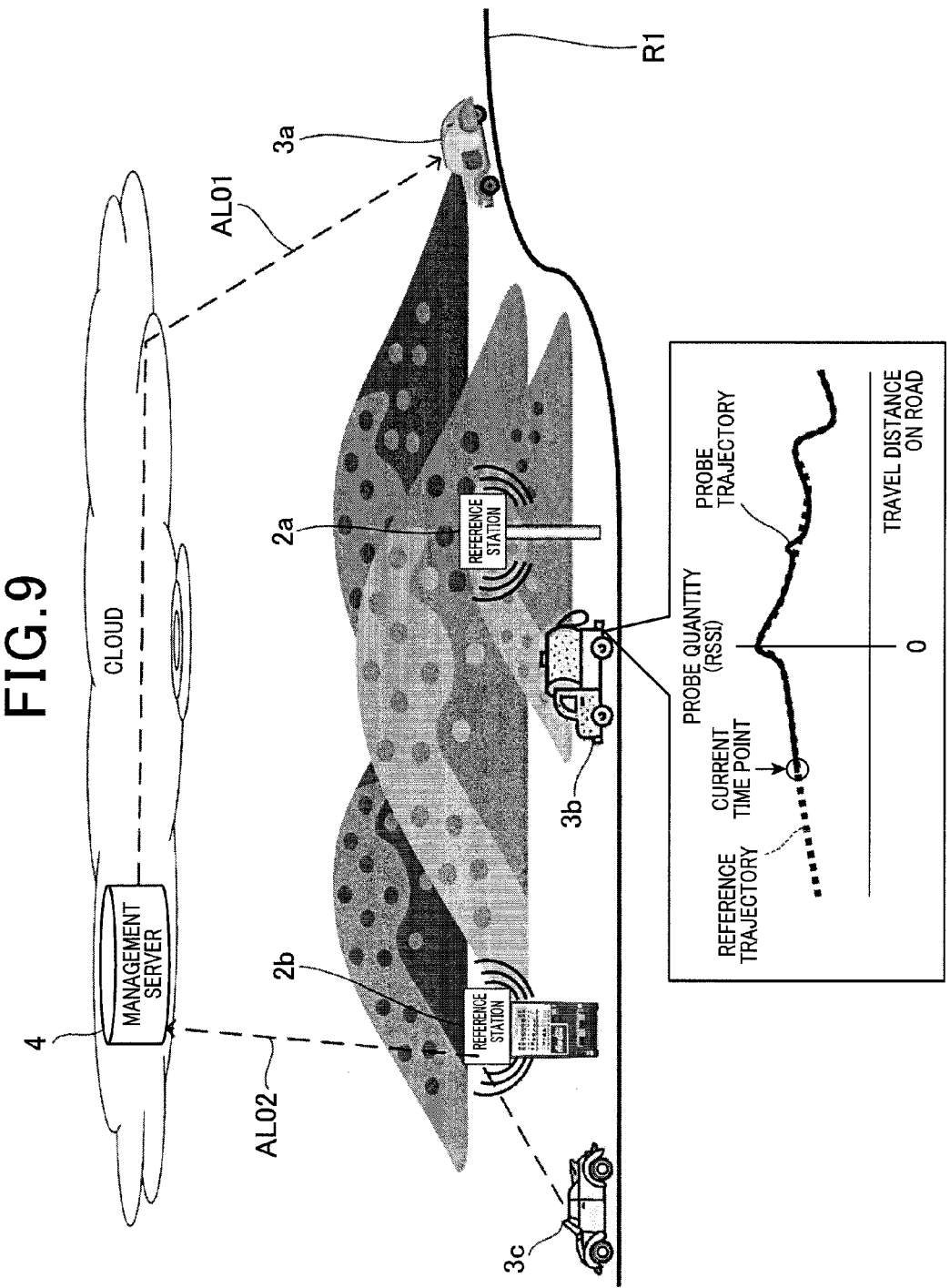
FIG. 9 is a diagram illustrating a specific example of position estimation, according to the first embodiment.

Referring to FIG. 9, hereinafter is described a specific example of position estimation performed in the wireless positioning system 1 configured as described above.

As shown in FIG. 9, the reference stations 2a and 2b are set up along a road R1. The reference stations 2a and 2b are arranged at an interval that an autonomous sensor of a vehicle can interpolate it with sufficient accuracy. The reference station 2a is not connected to the management server 4 via the wide-area wireless communication network NW, while the reference station 2b is connected to the management server 4 via the wide-area wireless communication network NW.

A vehicle that has the on-vehicle apparatus 3a (hereinafter referred to as first vehicle) travels on the road R1 toward the reference station 2a. A vehicle that installs the on-vehicle apparatus 3b (hereinafter referred to as second vehicle) travels on the road R1 away from the reference station 2a toward the reference station 2b. A vehicle that installs the on-vehicle apparatus 3c (hereinafter referred to as third vehicle) travels on the road R1 away from the reference station 2b.

The first vehicle that travels toward the reference station 2a acquires, from the management server 4, reference trajectory information of the reference station 2a regarding vehicle type and travelling direction which are the same as those of the first vehicle (see the arrow AL01).

The second vehicle that travels near the reference station 2a generates a probe trajectory in relation to the reference station 2a and calculates the current location of the second vehicle on the basis of the results of matching between the generated probe trajectory and the reference trajectory of the reference station 2a.

The third vehicle travels near the reference station 2b that enables connection to the management server 4. If the third vehicle is connected to the management server 4 via the reference station 2b, the third vehicle transmits the untransmitted probe trajectory information to the management server 4 via the reference station 2b (see the arrow AL02).

In the on-vehicle apparatus 3 configured in this way, the direct wireless communication device 13 receives data transmitted via radio from the reference station 2 by performing direct wireless communication and then the direct wireless communication device 13 detects the received signal strength RSSI (step S50). Further, the RAM 23 stores reference trajectory information.

In the reference trajectory information, two or more points of relation between the received signal strength RSSI and travel distance are set. The received signal strength RSSI is a signal strength at the time when the direct wireless communication device 13 receives data, via radio, transmitted from the reference station 2. The travel distance is a distance that the own vehicle has traveled from a point, i.e. a base point, nearest from the reference station 2, on the road in the vicinity of the reference station 2 (the distance is the reference travel distance mentioned above and corresponds to the position on the road).

Further, the position detector 12 calculates a travel distance of the own vehicle from the time point when a radio beacon has initially been detected (probe travel distance) (step S60). Then, probe trajectory information is generated, which indicates a relation between a plurality of received signal strengths RSSI of the direct wireless communication device 13 and a plurality of probe travel distances (step S70).

Then, the reference trajectory information and the probe trajectory information are compared to determine a relation between the reference travel distance and the probe travel distance (step S80). Then, the current location in the on-vehicle apparatus 3 is determined on the basis of the relation between the reference trajectory information and the probe trajectory information, and the currently detected received signal strength RSSI (steps S90 and S100).

Thus, the current location of the on-vehicle apparatus 3 can be determined by performing direct wireless communication with one reference station 2 corresponding to the reference trajectory information.

Therefore, positioning is performed without depending on the density of the reference stations 2 around the on-vehicle apparatus 3. This is because each reference station 2 is fixedly set up at a predetermined setting position and because the relation can be set between the condition (wireless reception condition) of receiving data via radio from the reference station 2 and the information (i.e., reference trajectory information) that indicates the position on the road built in the vicinity of the reference stations 2.

Reference trajectory information is provided for each vehicle type of the vehicle that installs the on-vehicle apparatus 3. Thus, when the probe quantity (the received signal strength RSSI in the present embodiment) changes depending on vehicle type, the positioning accuracy is prevented from being greatly varied depending on vehicle type.

Further, reference trajectory information is acquired from the management server 4 by performing wireless communication, via the wide-area radio communication network NW, with the management server 4 that manages reference trajectory information provided for each of the plurality of reference stations 2 (step S30). Thus, the on-vehicle apparatus 3 no longer requires to store, in advance, a number of pieces of reference trajectory information provided for the respective reference stations 2. Accordingly, the on-vehicle apparatus 3 can acquire, as necessary, a few pieces of reference trajectory information from the management server 4, from among the number of pieces of trajectory information, thereby saving the data storage area of the on-vehicle apparatus 3.

Generated probe trajectory information is transmitted to the management server 4 by performing wireless communication via the wide-area wireless communication network NW (step S20). Thus, the management server 4 that manages reference trajectory information is able to update the reference trajectory information using the newly acquired probe trajectory information.

In the embodiment described above, the on-vehicle apparatus 3 is the wireless communication apparatus of the present invention. Likewise, the reference station 2 is the radio transmitter; the direct wireless communication device 13 is the radio communicating means or unit; step S50 is the detecting means or unit; the RAM 23 is the reference information storing means or unit; step S60 is the distance measuring means; step S70 is the first generating means or unit; step S80 is the relation determining means or unit; and steps S90 and S100 are the position determining means or unit.

Further, the received signal strength RSSI is the radio reception condition of the present invention. Likewise, the "travel distance that the own vehicle has traveled from a point, i.e. a base point, nearest from the reference station 2, on the road in the vicinity of the reference station 2" is the location information (location related information); the reference trajectory information is the relation reference information (relation reference information); the probe travel distance is the relative distance information (relative distance related information); and the probe trajectory information is the first relation information (first relation measurement information).

Furthermore, step S30 is the second reference information acquiring means or unit. Likewise, step S20 is the second measurement information transmitting means or unit; and the management server 4 is the first management apparatus.

Second Exemplary Embodiment

Next, a second exemplary embodiment of the present invention is described with reference to FIGS. 10 to 15.

Figure 10:
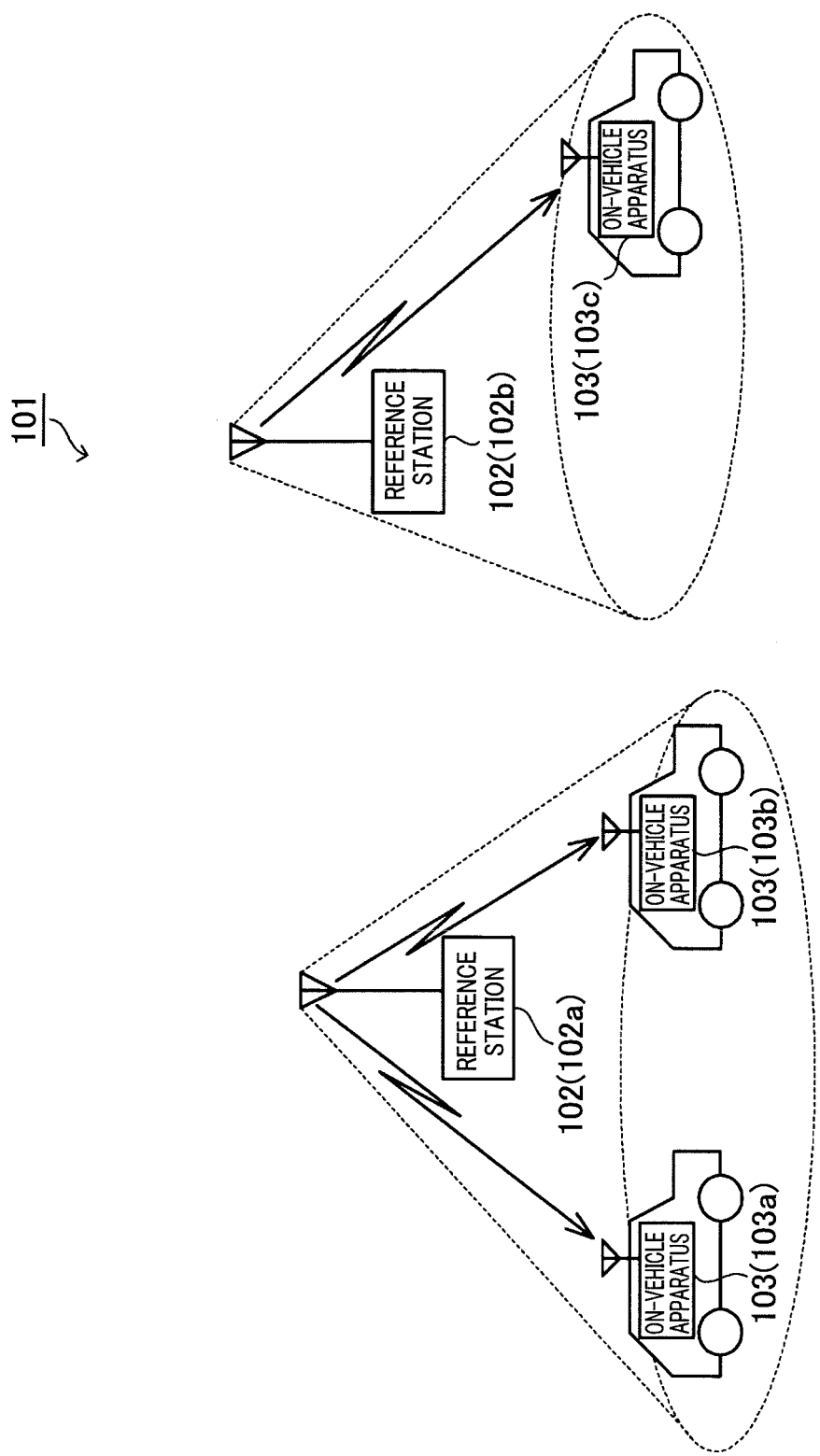
FIG. 10 is a diagram illustrating a configuration of a wireless positioning system according to a second embodiment of the present invention.

FIG. 10 is a diagram illustrating a configuration of a wireless positioning system 101, according to the second embodiment.

As shown in FIG. 10, the wireless positioning system 101 of the present embodiment includes a plurality of reference stations 102 (two reference stations 102a and 102b are shown in FIG. 10) and on-vehicle apparatuses 103 (three on-vehicle apparatuses 103a, 103b and 103c are shown in FIG. 10). The reference stations 102 are arranged being scattered in an out-of-service area of GPS (global positioning system) to perform direct wireless communication. The pm-vehicle apparatuses 3 are each installed in a motorcar to perform direct wireless communication.

The reference station 102 periodically transmits a radio beacon including identification information of the reference station 102 to the motorcars around it, using a direct wireless communication function.

Figure 11:
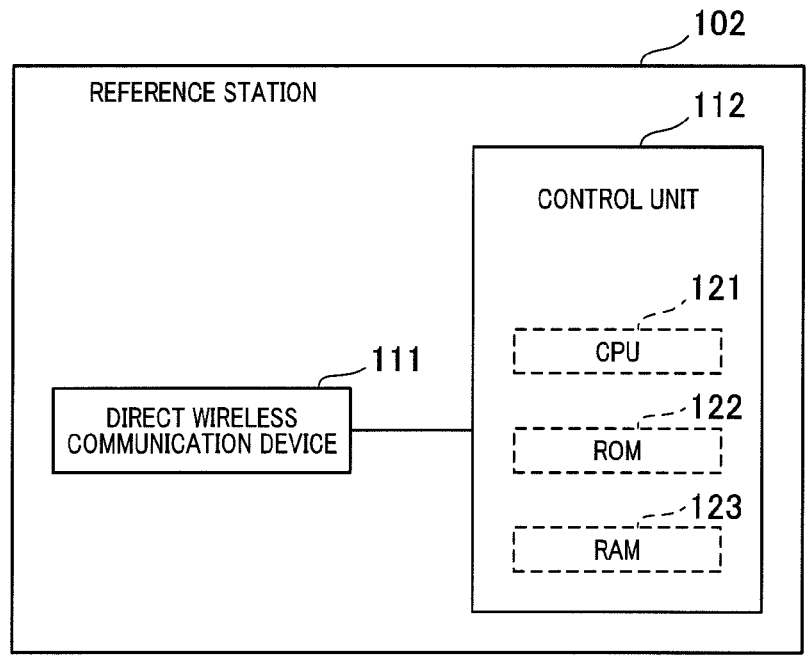
FIG. 11 is a block diagram illustrating a configuration of a reference station in the wireless positioning system of FIG. 10.

As shown in FIG. 11, each reference station 102 includes a direct wireless communication device 111 and a control unit 112. Of these components, the direct wireless communication device 111 performs direct wireless communication with the on-vehicle apparatus 103. The control unit 112 includes a CPU 121, a ROM 122 and a RAM 123. The control unit 112 controls the direct wireless communication device 111 by allowing the CPU 121 to perform a process which is based on a program stored in the ROM 122. In the RAM 123 of the control unit 112, reference trajectory information regarding the reference station 102 that installs this control unit 112 is classified and stored on the basis of vehicle type and travelling direction of vehicles.

Figure 12:
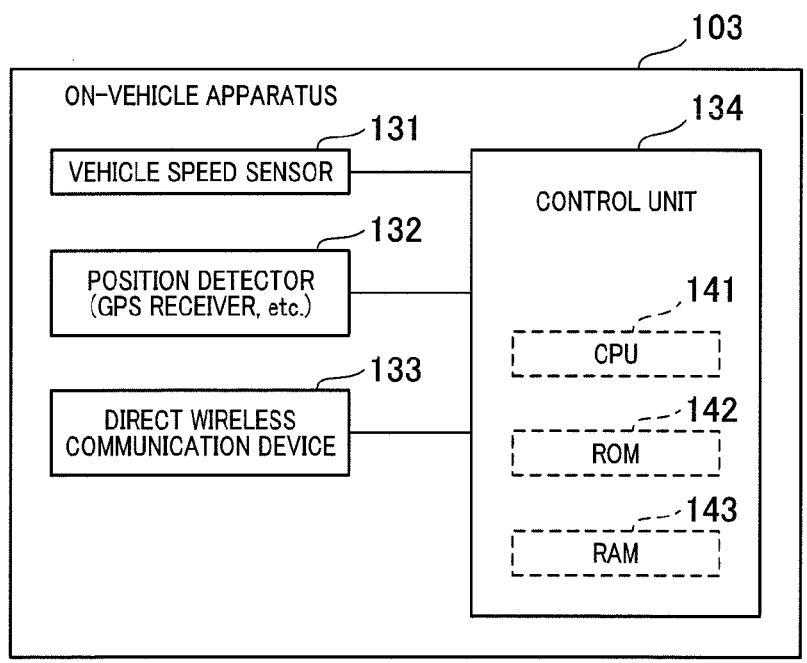
FIG. 12 is a block diagram illustrating a configuration of an on-vehicle apparatus 103 in the wireless positioning system of FIG. 10.

As shown in FIG. 12, the on-vehicle apparatus 103 includes a vehicle speed sensor 131, a position detector 132, a direct wireless communication device 133 and a control unit 134. Of these components, the vehicle sensor 131, the position detector 132 and the direct wireless communication device 133 are the same as the vehicle speed sensor 11, the position detector 12 and the direct wireless communication device 13, respectively, of the first embodiment. Therefore, description of these components is omitted. The control unit 134 includes a CPU 141, a ROM 142 and a RAM 143 and controls the direct wireless communication 133 by allowing the CPU 141 to perform a program stored in the ROM 142.

In the wireless positioning system 101 configured as described above, the on-vehicle apparatus 103 performs a position estimation process that will be described later. The reference station 102 performs a trajectory update process that will be described later.

Figure 13:
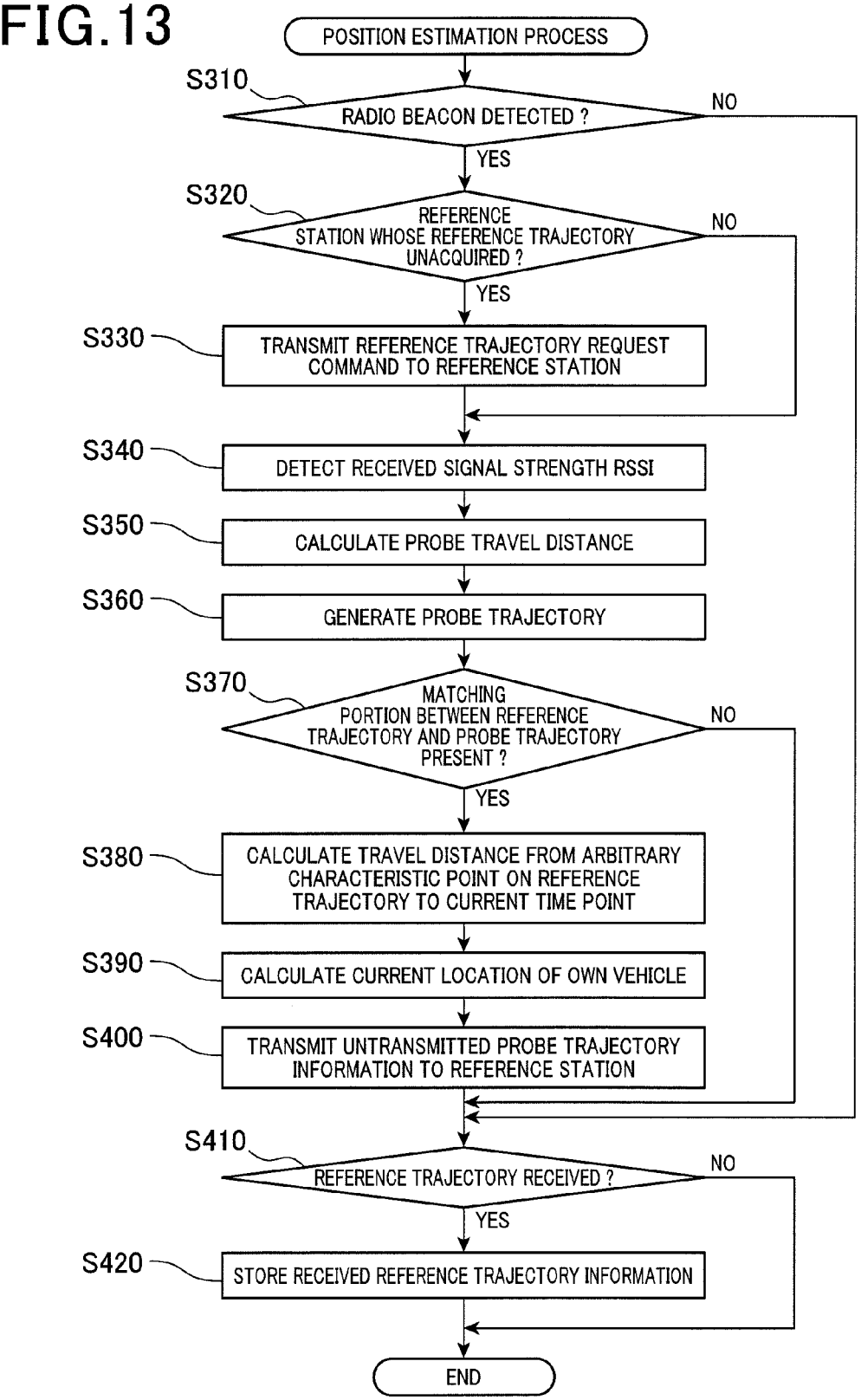
FIG. 13 is a flow diagram illustrating a position estimation process, according to the second embodiment.

First, referring to FIG. 13, hereinafter are described steps of the position estimation process performed by the CPU 141 of the on-vehicle apparatus 103. The position estimation process is repeatedly performed while the CPU 141 is activated.

When the position estimation process is performed, the CPU 141 determines, first, at step S310, whether or not a radio beacon has been detected. If no radio beacon has been detected (NO at step S310), control proceeds to step S410. On the other hand, if a radio beacon has been detected (YES at step S310), control proceeds to step S320.

At step S320, it is determined whether or not the reference station 102 specified by identification information included in the radio beacon is the one whose reference trajectory has not been yet acquired by the on-vehicle apparatus 103. If the reference station 102 is the one whose reference trajectory has already been acquired (NO at step S320), control proceeds to step S340.

On the other hand, if the reference station 102 is the one whose reference trajectory has been unacquired (YES at step S320), control proceeds to step S330. At step S330, the CPU 141 transmits a request for transmitting reference trajectory information (hereinafter referred to as reference trajectory request command) to the reference station 102 corresponding to the detected radio beacon.

In transmitting the reference trajectory request command, information on the vehicle type of the vehicle that installs the on-vehicle apparatus 103 (hereinafter referred to as "the own vehicle") and information on the travelling direction of the own vehicle are also transmitted. Then, control proceeds to step S340. At step S340, a probe quantity (received signal strength RSSI in the present embodiment) of the detected radio beacon is detected.

At the same time, at step S350, the CPU 141 calculates a travel distance (probe travel distance) of the own vehicle from the time point when the radio beacon has initially been detected. Then, at step S360, a probe trajectory (see FIG. 6) is generated, which indicates a relation between probe quantity and probe travel distance from the time point when the radio beacon has initially been detected up to the current time point.

Then, at step S370, if the reference trajectory information corresponding to the detected radio beacon has already been acquired, the probe trajectory generated at step S360 is superimposed over the reference trajectory indicated by the reference trajectory information (see FIG. 6) to determine whether or not there is a matching portion, with a degree of matching equal to or more than a predetermined trajectory matching threshold.

If there is not a matching portion with a degree of matching equal to or more than the trajectory matching threshold (NO at step S370), control proceeds to step S410. On the other hand, if there is a matching portion with a degree of matching equal to or more than the trajectory matching threshold (YES at step S370), the CPU 141 calculates a travel distance TD (see FIG. 6) from an arbitrary characteristic point CP on the reference trajectory to the current point.

Then, at step S390, based on the travel distance TD from the characteristic point CP to the current point, the CPU 141 calculates the current location of the own vehicle on the road the own vehicle travels. Further, at step S400, the CPU 141 transmits probe trajectory information indicating untransmitted probe trajectory to the reference station 102 corresponding to the detected radio beacon, together with the information indicating the vehicle type of the own vehicle, the travelling direction of the own vehicle and the current time. Then, control proceeds to step S410.

At step S410, it is determined whether or not reference trajectory information has been received from the reference station 102 corresponding to the detected radio beacon. If reference trajectory information has not been received (NO at step S410), the position estimation process is once ended. On the other hand, if the reference trajectory information has been received (YES at step S410), control proceeds to step S420. At step S420, the received reference trajectory information is stored in the RAM 143 and the position estimation process is once ended.

Figure 14:
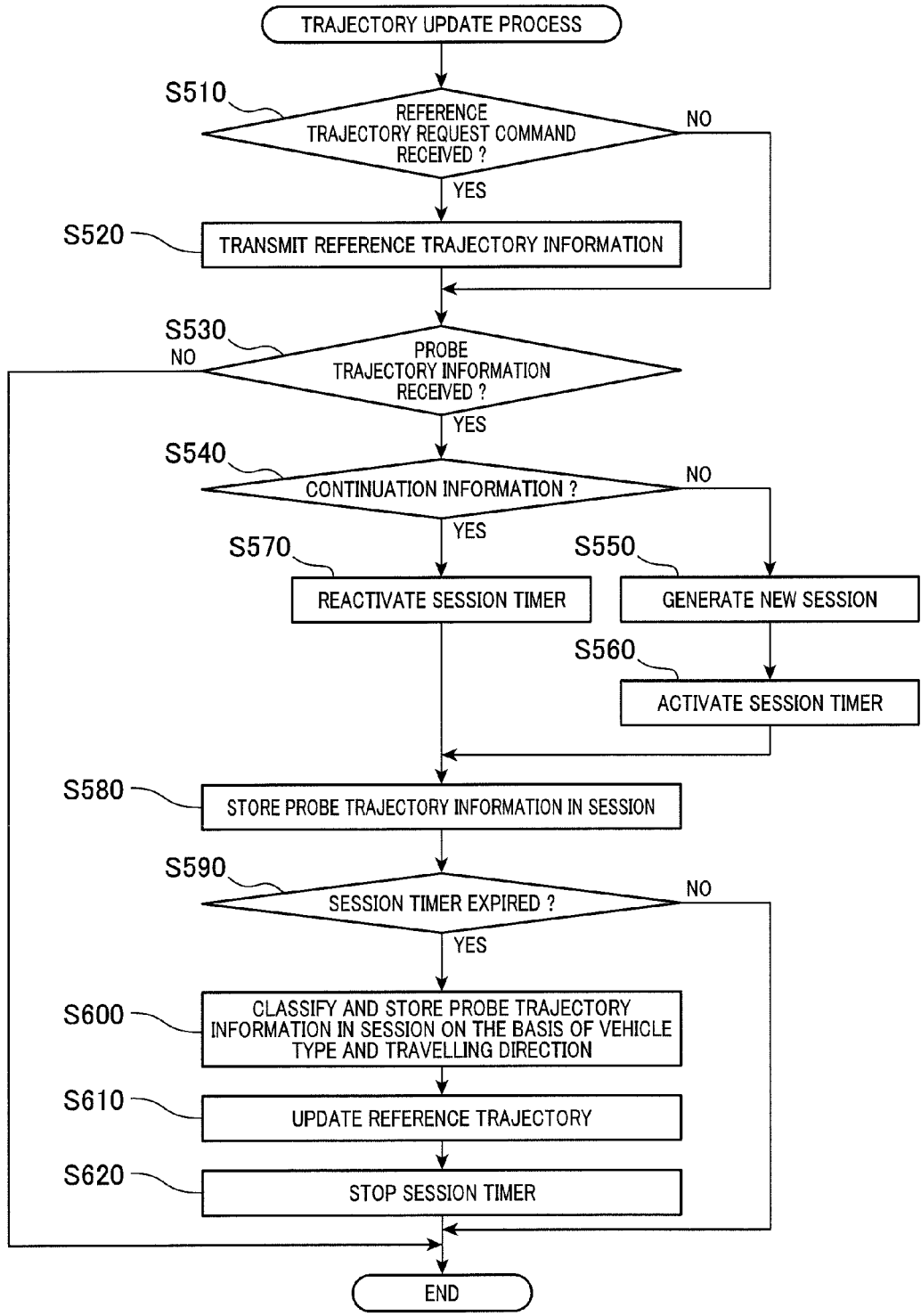
FIG. 14 is a flow diagram illustrating a trajectory update process, according to the second embodiment.

Referring to FIG. 14, hereinafter are described steps of the trajectory update process performed by the CPU 121 of the reference station 102. The trajectory update process is repeatedly performed while the CPU 121 is activated.

When the trajectory update process is performed, the CPU 121 determines, first, at step S510, whether or not a reference trajectory request command has been received from the on-vehicle apparatus 103. If the reference trajectory request command has not been received (NO at step S510), control proceeds to step S530. On the other hand, if the reference trajectory request command has been received (YES at step S510), control proceeds to step S520.

At step S520, the CPU 121 transmits reference trajectory information to the on-vehicle apparatus 103. The reference trajectory information includes a reference trajectory having the vehicle type and the travelling direction that are specified by the vehicle type information and the travelling direction information, respectively, received together with the reference trajectory request command. Then, control proceeds to step S530.

At step S530, the CPU 121 determines whether or not probe trajectory information has been received from the on-vehicle apparatus 103. If probe trajectory information has not been received (NO at step S530), the trajectory update process is once ended. On the other hand, if probe trajectory information has been received (YES at step S530), control proceeds to step S540.

At step S540, the CPU 121 determines whether or not the received probe trajectory information is continuation information of a probe session in the past, which has been generated at step S550 that will be described later. If the received probe trajectory information is not the continuation information (NO at step S540), control proceeds to step S550 where a new probe session is generated.

The probe session corresponds to a storage area provided for storing probe trajectory information which has been transmitted from a certain on-vehicle apparatus 103 to the reference station 102, from when the on-vehicle apparatus 103 approaches the reference station 102 until when it moves away therefrom. The probe session is set with the vehicle type information and the travelling direction information, which correspond to the probe trajectory information received at step S530.

Then, at step S560, a session timer is activated and control proceeds to step S580. For example, the count of the session timer is incremented every 100 ms. When activated, the count is incremented from zero.

On the other hand, if the received probe trajectory information is continuation information (YES at step S540), control proceeds to step S570 where the session timer is reactivated. Then, control proceeds to step S580.

At step S580, the received probe trajectory information is stored in the probe session. Then, at step S590, the CPU 121 determines whether or not the count of the session timer is equal to or larger a predetermined expiration threshold. In other words, the CPU 121 determines whether or not the elapsed time since previous reception of the probe trajectory information has exceeded the time corresponding to the expiration threshold.

If the count of the session timer is smaller than the expiration threshold (NO at step S590), the trajectory update process is once ended. On the other hand, if the count of the session timer is equal to or larger than the expiration threshold (YES at step S590), control proceeds to step S600.

At step S600, the probe trajectory information stored in the probe session is classified and stored in the RAM 123 on the basis of the vehicle type of vehicle installing the on-vehicle apparatus 103 and travelling direction of the vehicle (travelling direction in the inbound lane, or travelling direction in the outbound lane), according to the vehicle type information and the travelling direction information set in the probe session.

Then, at step S610, similar to step S230 of the first embodiment, the reference trajectory having a vehicle type and a travelling direction, which are the same as those of the probe trajectory information added at step S600, is updated using the probe trajectory added at step S600. Further, at step S620, the increment of the count of the session timer is stopped and then the trajectory update process is once ended.

Figure 15:
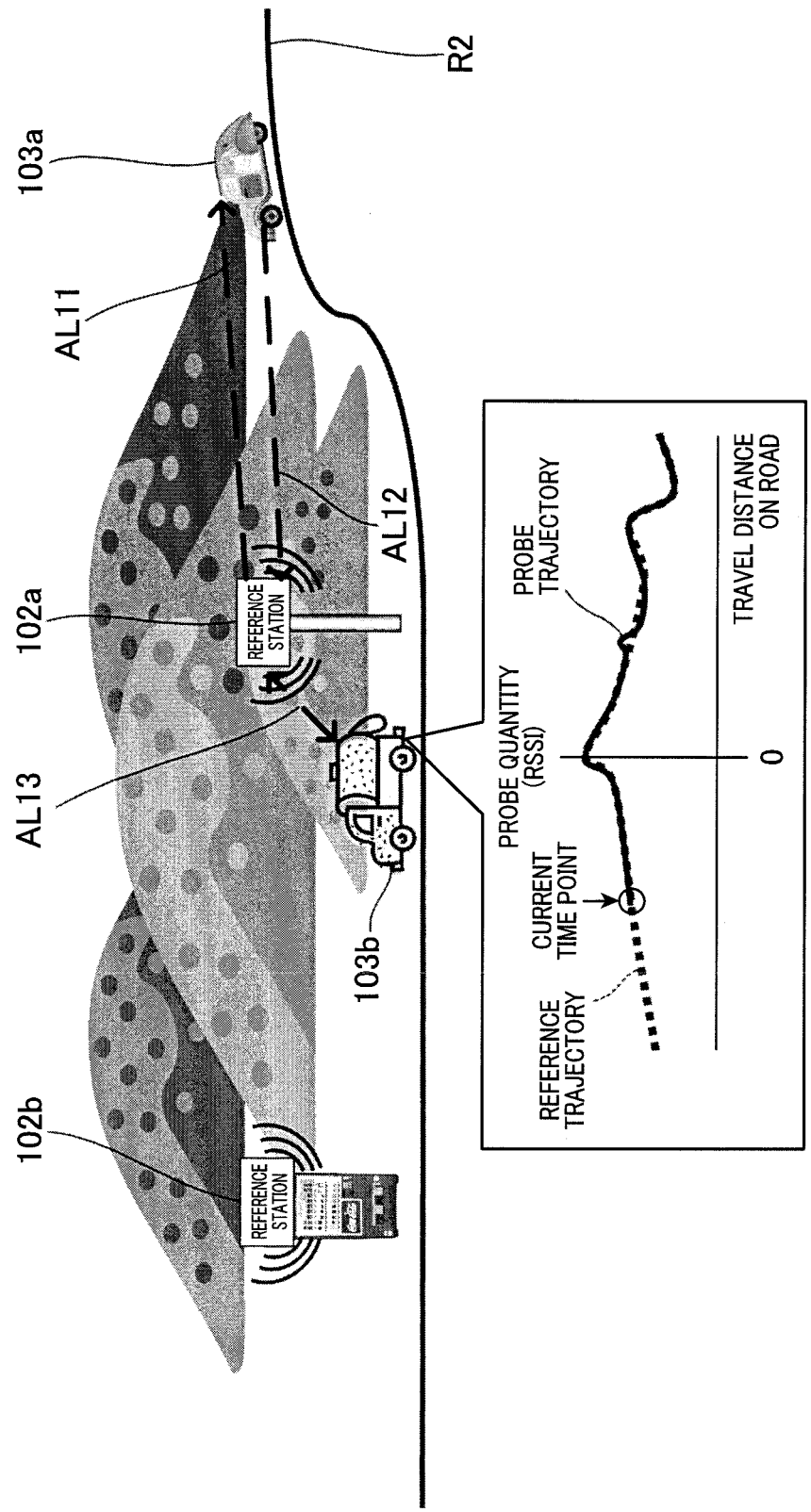
FIG. 15 is a diagram illustrating a specific example of position estimation, according to the second embodiment.

Referring to FIG. 15, hereinafter is described a specific example of position estimation performed in the wireless positioning system 101 configured as described above.

As shown in FIG. 15, the reference stations 102a and 102b are set up along a road R2. The reference stations 102a and 102b are arranged at an interval that an autonomous sensor of a vehicle can interpolate it with sufficient accuracy.

A vehicle that installs the on-vehicle apparatus 103a (hereinafter referred to as first vehicle) travels on the road R2 toward the reference station 102a. A vehicle that installs the on-vehicle apparatus 103b (hereinafter referred to as second vehicle) travels on the road R2 away from the reference station 102a toward the reference station 102b.

When the first vehicle approaches the reference station 102a such that a radio beacon from the reference 102a can be detected, the first vehicle acquires reference trajectory information of the reference station 102a, regarding the vehicle type and the travelling direction which are the same as those of the first vehicle (see the arrow AL11). Also, the first vehicle transmits untransmitted probe trajectory information to the reference station 102a (see the arrow AL12).

The second vehicle, which is travelling near the reference station 102a, generates a probe trajectory in relation to the second reference station 102a and calculates the current location of the second vehicle on the basis of the results of matching between the generated probe trajectory and the reference trajectory of the reference station 102a. At the same time, the second vehicle transmits untransmitted probe trajectory information to the reference station 102a (see the arrow AL13).

In the on-vehicle apparatus 103 configured as described above, reference trajectory information transmitted from the reference station 102 is acquired using the direct wireless communication device 133 (steps S320, S330, S410 and S420). Thus, the reference trajectory information is acquired without using a communication device that performs wireless communication via the wide-area wireless communication network NW.

Further, using the direct wireless communication device 133, generated probe trajectory information is transmitted to the reference station 102 (step S400). Thus, the reference station 102, in which reference trajectory information is stored, updates the reference trajectory information using the newly acquired probe trajectory information.

In the embodiment described above, the on-vehicle apparatus 103 is the wireless communication apparatus of the present invention. Likewise, the reference station 102 is the radio transmitter; the direct wireless communication device 133 is the radio communicating means or unit; step S340 is the detecting means or unit; the RAM 143 is the reference information storing means or unit; step S350 is the distance measuring means or unit; step S360 is the first generating means or unit; step S370 is the relation determining means or unit; and steps S380 and S390 are the position determining means or unit.

Steps S320, S330, S410 and S420 are the first reference information acquiring means or unit. Likewise, step S400 is the first measurement information transmitting means or unit.

Third Exemplary Embodiment

Next, a third exemplary embodiment of the present invention is described with reference to FIGS. 16 to 18.

In the third embodiment, only the differences from the second embodiment are described. Also, in the third embodiment, the components identical with or similar to those in the second embodiment are given the same reference numerals for the sake of omitting unnecessary explanation.

Figure 16:
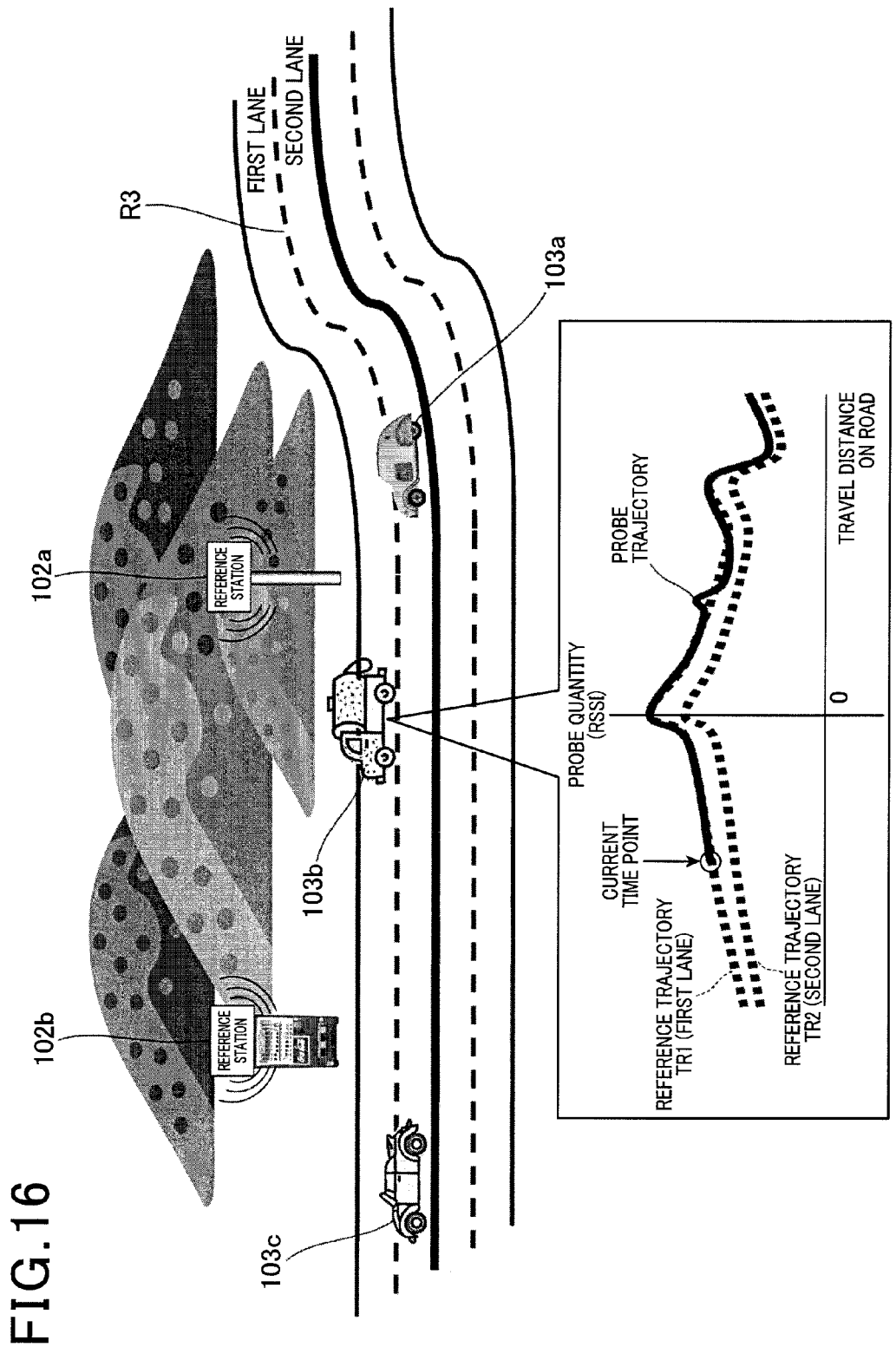
FIG. 16 is a diagram illustrating a specific example of position estimation according to a third embodiment of the present invention.

As shown in FIG. 16, the wireless positioning system 101 of the third embodiment is different from the second embodiment in that the reference stations 102a and 102b are set up along a road R3 having two lanes each way, and the position estimation process and the trajectory update process are changed. The remaining configuration is similar to that of the second embodiment.

In the RAM 123 of the control unit 112, pieces of reference trajectory information regarding the reference station 102 that installs the control unit 112 are classified and stored on the basis of vehicle type and traveling direction of vehicles. Each piece of reference trajectory information includes a reference trajectory of each of first and second lanes configuring the two lanes of each way (see the reference trajectories TR1 and TR2 in FIG. 16).

Figure 17:
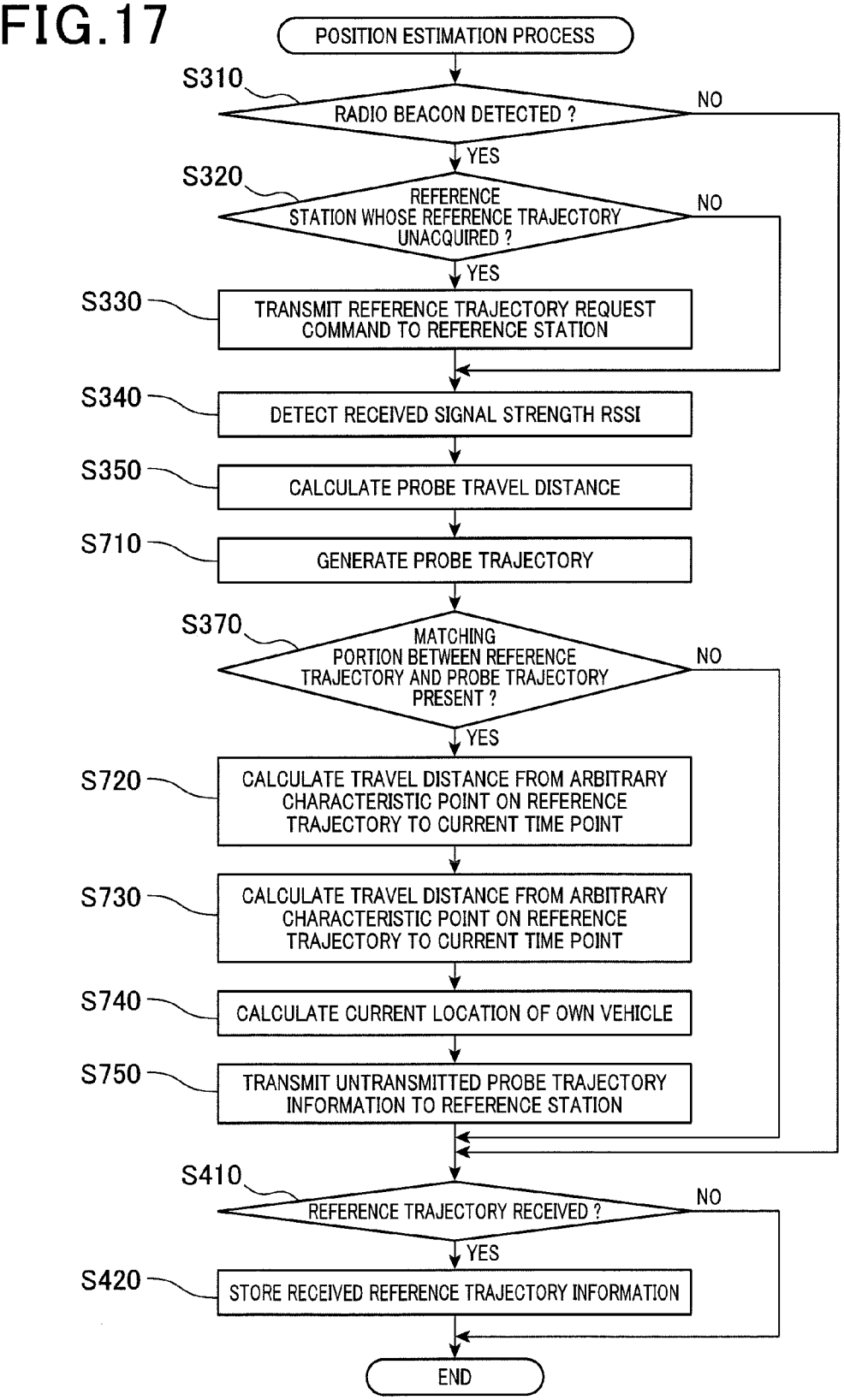
FIG. 17 is a flow diagram illustrating a position estimation process, according to the third embodiment.

As shown in FIG. 17, in the position estimation process according to the third embodiment, step S360 and steps S380 to S400 are omitted and steps S710 to S750 are added. The remaining steps are similar to those of the second embodiment.

Specifically, after finishing step S350, control proceeds to step S710. At step S710, the CPU 141 of the on-vehicle apparatus 103 generates a probe trajectory (see FIG. 6), which indicates a relation between probe quantity and probe travel distance from the time point when a radio beacon has initially been detected up to the current time point. The probe quantity additionally includes the speed and the steering angle of the own vehicle at the time point when the probe quantity has been detected. When step S710 is finished, control proceeds to step S370.

At step S370, if there is a matching portion with a degree of matching equal to or more than the trajectory matching threshold (YES at step S370), control proceeds to step S720.

At step S720, the lane corresponding to the reference trajectory that includes the matching portion with a degree of matching equal to or more than the trajectory matching threshold is set as a lane on which the own vehicle travels currently.

Then, at step S730, the CPU 141 calculates a travel distance TD from an arbitrary characteristic point CP to the current time point on the reference trajectory that corresponds to the set lane.

Then, at step S740, the CPU 141 calculates the current location of the own vehicle on the road on which the own vehicle travels, on the basis of the travel distance TD from the characteristic point CP to the current time point.

Then, at step S750, the CPU 141 transmits probe trajectory information indicating an untransmitted probe trajectory to the reference station 102 corresponding to the detected radio beacon, together with the information indicating the vehicle type and travel direction of the own vehicle and current time. Then, control proceeds to step S410.

Figure 18:
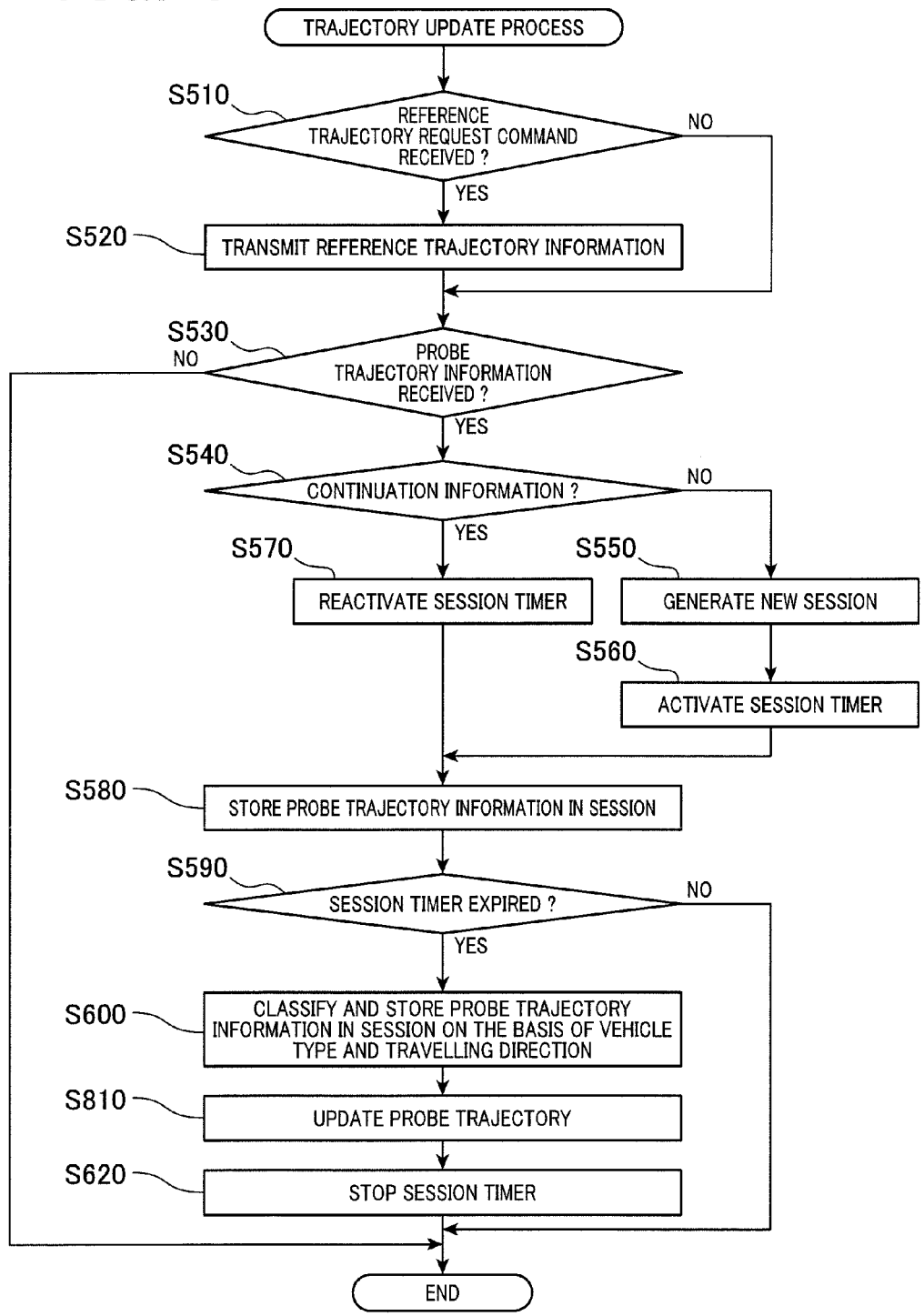
FIG. 18 is a flow diagram illustrating a trajectory update process, according to the third embodiment.

As shown in FIG. 18, in the trajectory update process of the third embodiment, step S610 is omitted and step S810 is added. The remaining steps are similar to those of the second embodiment.

Specifically, when step S600 is finished, control proceeds to step S810. At step S810, similar to step S230 of the first embodiment, the CPU 121 of the reference station 102 updates the reference trajectory having the vehicle type and travelling direction which are the same as those of the probe trajectory information added at step S600, using the probe trajectory added at step S600. However, the reference trajectory having the same vehicle type and travelling direction includes the reference trajectory of the first lane and the reference trajectory of the second lane.

Accordingly, at step S810, the CPU 121 determines whether the reference trajectory corresponds to the probe trajectory of the first lane or the probe trajectory of the second lane, on the basis of the speed information and the steering angle information added to the probe quantity of the probe trajectory, thereby updating the reference trajectory. When step S810 is finished, control proceeds to step S620.

In the on-vehicle apparatus 103 configured as described above, reference trajectory information is provided for each lane of the road R3. Thus, by comparing the reference trajectory information provided for each lane of the road R3 with the probe trajectory information, the lane on which the vehicle installing the on-vehicle apparatus 103 (the own vehicle) travels can be specified.

Fourth Exemplary Embodiment

Next, a fourth exemplary embodiment of the present invention is described with reference to FIGS. 19 to 20.

The fourth embodiment is described focusing on the differences from the first embodiment. Also, in the fourth embodiment, the components identical with or similar to those in the first embodiment are given the same reference numerals for the sake of omitting unnecessary explanation.

The wireless positioning system 1 of the fourth embodiment is similar to that of the first embodiment except that the position estimation process and the trajectory update process are changed.

Figure 19:
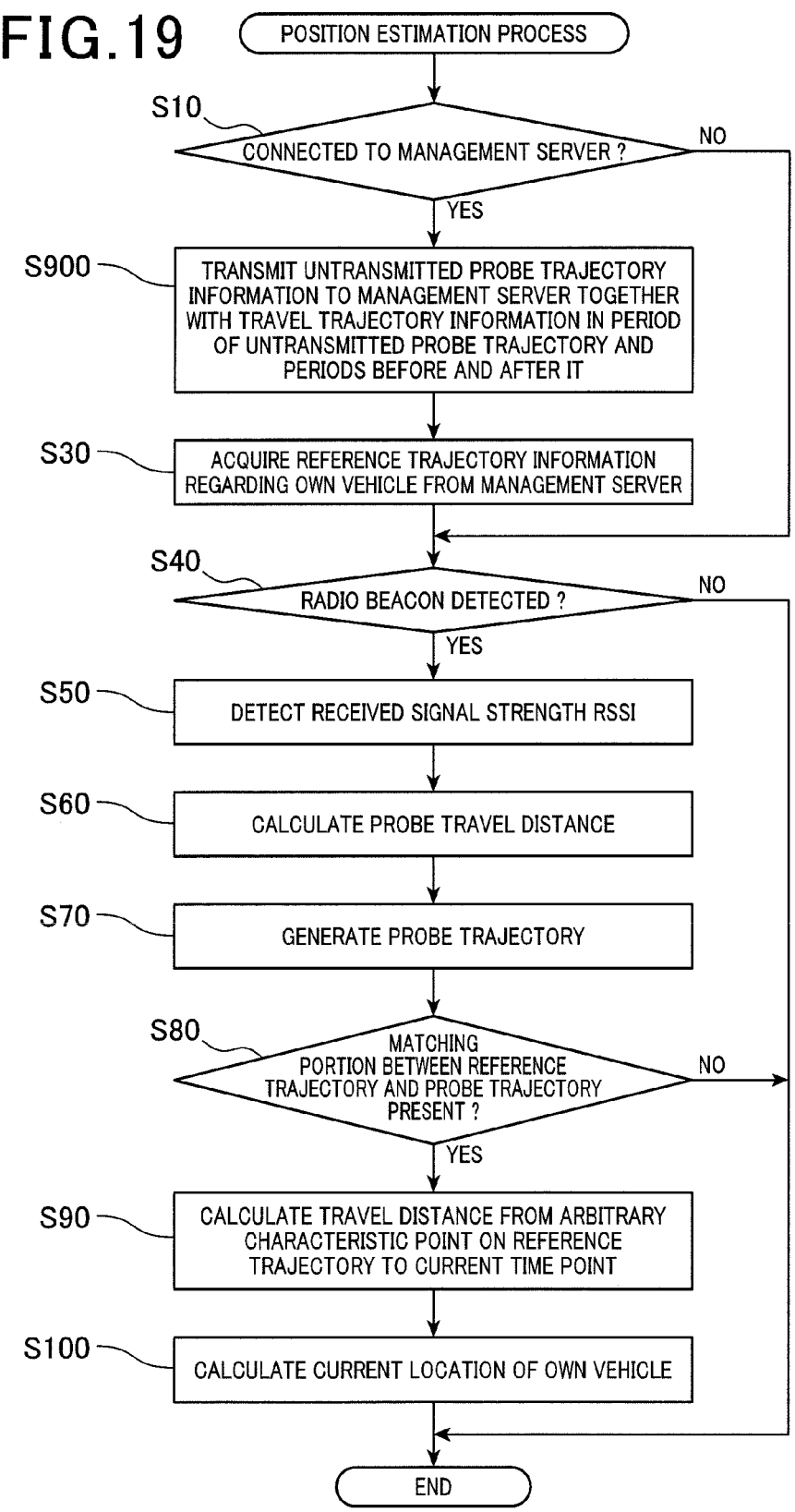
FIG. 19 is a flow diagram illustrating a position estimation process, according to a fourth embodiment of the present invention.
Figure 20:
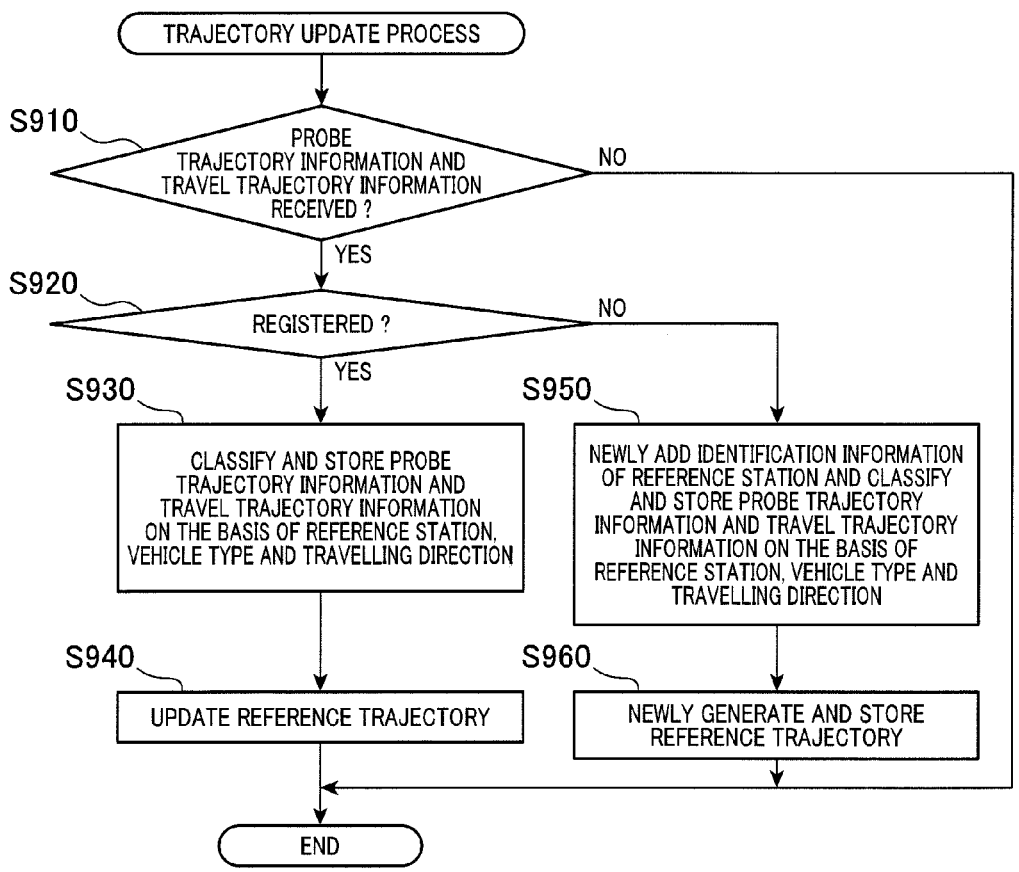
FIG. 20 is a flow diagram illustrating a trajectory update process, according to the fourth embodiment.

First, as shown in FIG. 19, in the position estimation process according to the fourth embodiment, step S20 is omitted but, instead, step S900 is added. The remaining steps are similar to those of the first embodiment.

Specifically, when step S10 is finished, control proceeds to step S900. At step S900, if there is any probe trajectory not yet transmitted to the management server 4, the CPU 21 of the on-vehicle apparatus 3 transmits probe trajectory information indicating an untransmitted probe trajectory to the management server 4, together with identification information of the reference station 2 and the information indicating the vehicle type and travelling direction of the own vehicle and current time.

Further, the CPU 21 transmits travel trajectory information to the management server 4. The travel trajectory information indicates a travel trajectory that the own vehicle has traveled in a period including the period corresponding to the untransmitted probe trajectory and periods before and after the period of the untransmitted probe trajectory. When step S900 is finished, control proceeds to step S30.

In the trajectory update process of the fourth embodiment, steps S210 to S230 are omitted but, instead, steps S910 to S960 are added. The remaining steps are similar to those of the first embodiment.

Specifically, when the trajectory update process is performed, the CPU 41 of the management server 4 determines, first, at step S910, whether or not probe trajectory information and travel trajectory information have been received from the on-vehicle apparatus 3.

If the probe trajectory information and the travel trajectory information have not been received (NO at step S910), the trajectory update process is once ended. On the other hand, if the probe trajectory information and the travel trajectory information have been received (YES at step S910), control proceeds to step S920.

At step S920, the CPU 41 determines whether or not the received probe trajectory information is about the reference station already registered. Specifically, if the identification information of the reference station 2 is added to the probe trajectory information, the CPU 41 determines that the probe trajectory information is about the reference station already registered.

If the identification information of the reference station 2 is not added to the probe trajectory information, the CPU 41 makes a determination by comparing the reference trajectory information stored in the management server 4 with the received probe trajectory information and travel trajectory information.

If the received probe trajectory information is about the reference station already registered (YES at step S920), control proceeds to step S930. At step S930, the received probe trajectory information is classified and stored on the basis of the identification information of the reference station, the vehicle type of the vehicle that installs the on-vehicle apparatus 3, and the travelling direction of the vehicle.

Then, at step S940, the CPU 41 updates the reference trajectory having the same reference station, vehicle type and travelling direction as those of the added probe trajectory information, using the probe trajectory added at step S930. Then, the trajectory update process is once ended.

On the other hand, if the received probe trajectory information is not about the reference station already registered (NO at step S920), control proceeds to step S950. At step S950, identification information of the reference station is newly allocated to the received probe trajectory information and travel trajectory information, followed by classifying and storing the probe trajectory information and the travel trajectory information on the basis of the identification information of the reference station, the vehicle type of the vehicle that installs the on-vehicle apparatus 3 and the travelling direction of the vehicle.

Then, at step S960, a reference trajectory is newly generated on the basis of the received probe trajectory information and travel trajectory information, followed by classifying and storing the reference trajectory on the basis of the identification information of the reference station, the vehicle type of the vehicle and the travelling direction of the vehicle. Then, the trajectory update process is once ended.

Figure 21:
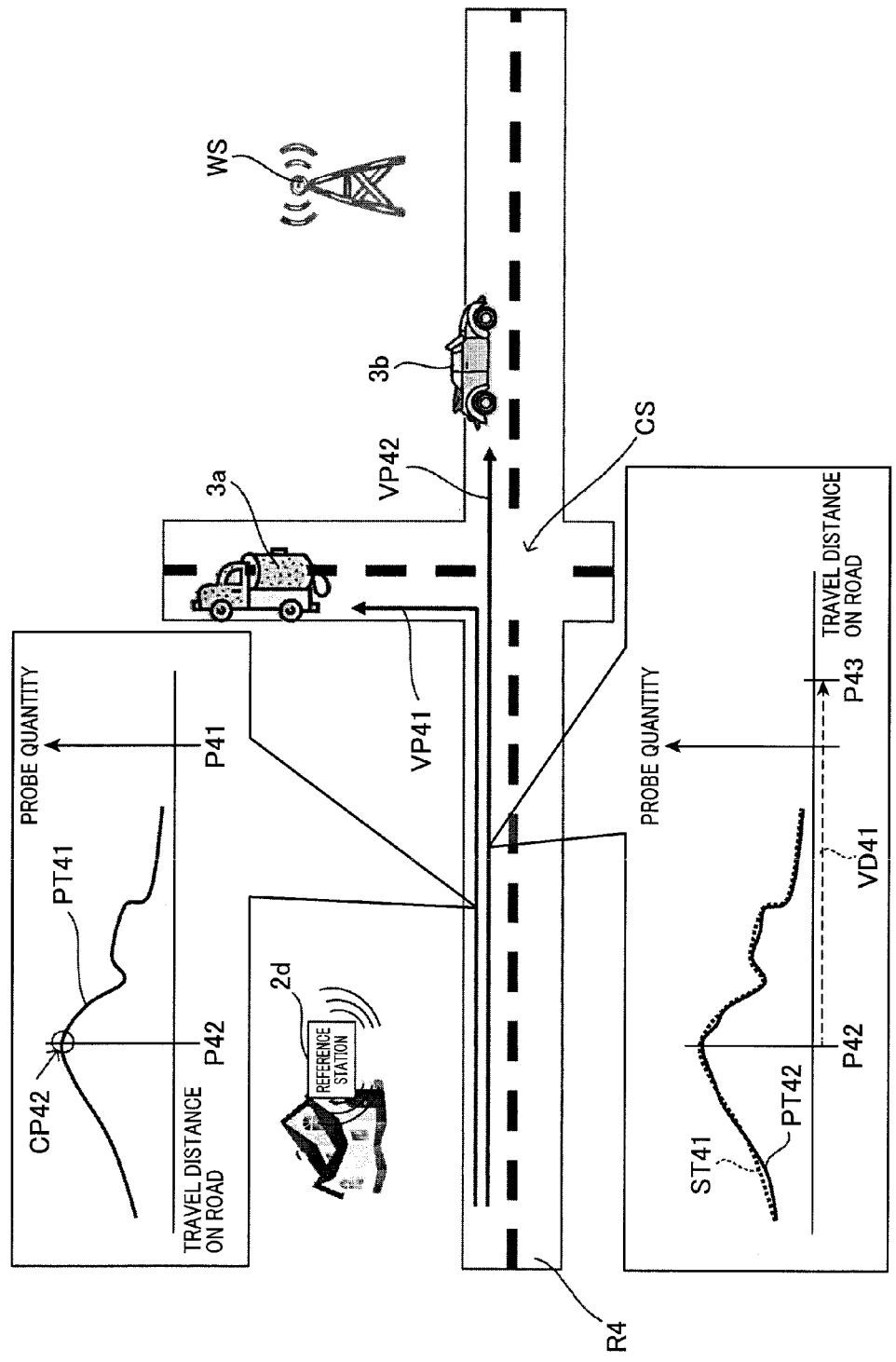
FIG. 21 is a diagram illustrating a specific example of position estimation, according to the fourth embodiment.

Referring now to FIG. 21, hereinafter is described a specific example in which a reference trajectory is newly registered in the wireless positioning system 1 configured as described above.

As shown in FIG. 21, a vehicle installing the on-vehicle apparatus 3a (hereinafter referred to as first vehicle) travels on a road R4 and turns to the left at a cross-point CP of the road R4 (see the travel trajectory VP41). At a position along the road R4 short of the cross-point CP, an unregistered reference station 2d is set up.

The first vehicle, when travelling along the road R4 and near the reference station 2d, is able to detect a radio beacon from the reference station 2d to thereby generate a probe trajectory PT41 (see FIG. 21).

The management server 4, upon reception of the probe trajectory information indicating the probe trajectory TP41 and the travel trajectory indicating the travel trajectory VP41, determines the point of the left turn on the travel trajectory VP41 as being the position of a cross-point.

Then, using a position P41 of the cross-point as a reference, the management server 4 is able to specify a position P42 (characteristic point CP42) on the road R4, at which probe quantity is maximized in the probe trajectory PT41.

Thus, the management server 4 is able to newly register a reference trajectory that indicates a relation between probe quantity and position on the road R4, as a reference trajectory ST41 of the reference station 2d (see FIG. 21).

After the reference trajectory ST40 of the reference station 2d has been registered, a vehicle installing the on-vehicle apparatus 3b (hereinafter referred to as second vehicle) travels on the road R4 and goes straight on the cross-point CS of the road R4 (see the travel trajectory VP42).

In this case, the on-vehicle apparatus 3b compares probe trajectory information that indicates a probe trajectory PT42 (see FIG. 2) generated using a radio beacon from the reference station 2d, with the reference trajectory ST41 of the reference station 2d to thereby specify the position P42 on the road R4, at which the probe quantity is maximized. After that, the on-vehicle apparatus 3b acquires a travel distance VE41 from the position 42 using an autonomous sensor to thereby estimate a current location 43 (see FIG. 21) on the road R4.

A WAN (wide area network) base station WS (see FIG. 21), which is not power controlled, can also be registered as a reference station.

The on-vehicle apparatus 3 configured as described above transmits travel trajectory information corresponding to probe trajectory information to the management server 4 (step S900). Thus, the management server 4 is able to generate a reference trajectory that indicates a relation between probe quantity and position on the road R4, on the basis of the received probe trajectory information and travel trajectory information. Therefore, the reference trajectory information of the reference station 2 which is not registered in the management server 4 can be newly registered.

In the embodiment described above, step S900 is the travel trajectory transmitting means or unit. Likewise, the travel trajectory information is the movement trajectory information.

Fifth Exemplary Embodiment

Next, a fifth exemplary embodiment of the present invention is described with reference to FIGS. 22 to 29.

Figure 22:
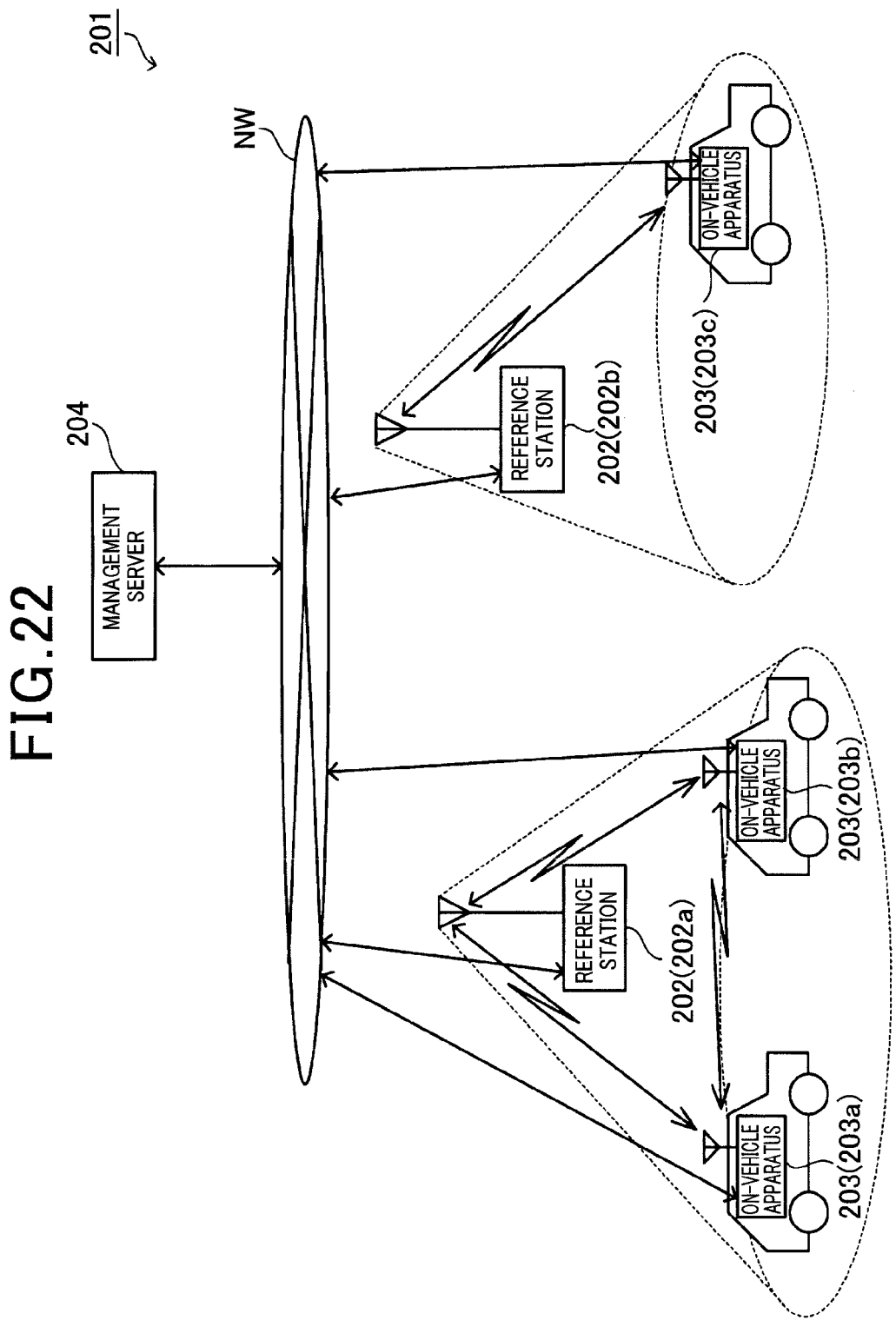
FIG. 22 is a diagram illustrating a configuration of a wireless positioning system according to a fifth embodiment of the present invention.

As shown in FIG. 22, a wireless positioning system 201 of the present embodiment includes a plurality of reference stations 202 (two reference stations 202a and 202b are shown in FIG. 22), an on-vehicle apparatus 203 (three on-vehicle apparatuses 203a, 203b and 203c are shown in FIG. 22) and a management server 204. The plurality of reference stations 202 are set up, being scattered along a road. The on-vehicle apparatus 203 is installed in a vehicle to perform direct wireless communication. The management server 204 manages data for measuring an inter-vehicle distance.

The reference station 202 periodically transmits a radio beacon including identification information of the reference station 202 to the vehicles around it, using a direct wireless communication function. Also, the plurality of reference stations 202 are each configured to perform data communication with the management server 204 via a wide-area wireless communication network NW (e.g., mobile phone communication network).

Figure 23:
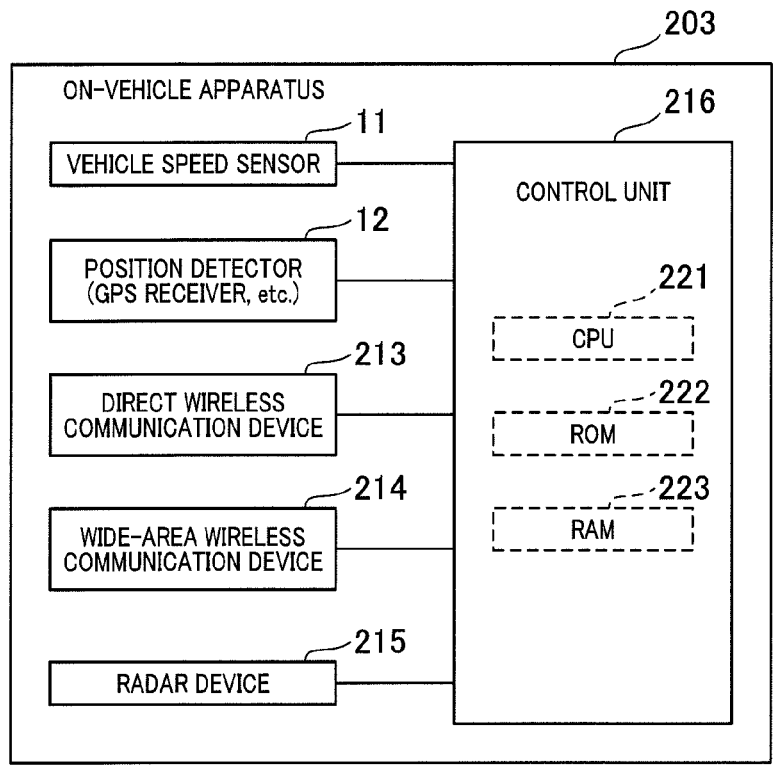
FIG. 23 is a block diagram illustrating a configuration of an on-vehicle apparatus in the wireless positioning system of FIG. 22.

As shown in FIG. 23, the on-vehicle apparatus 203 includes a vehicle speed sensor 11, position detector 12, direct wireless communication device 213, wide-area wireless communication device 214, radar device 215 and control unit 216.

Of these components, the direct wireless communication device 213 performs direct wireless communication with the reference station 202 and the on-vehicle apparatus 203 of some other vehicle.

The wide-area wireless communication device 214 performs data communication with the management server 204 via the wide-area wireless communication network NW.

The radar device 215 transmits radar waves of a millimeter wave band in a forward direction of the vehicle that installs the on-vehicle apparatus 203 (hereinafter referred to as "the own vehicle") and receives reflected radar waves to detect a distance to a point at which the radar waves have been reflected.

The control unit 216 includes a CPU 221, ROM 222 and RAM 223. The control unit 216 allows the CPU 221 to execute a program stored in the ROM 222 to thereby control the communication devices 213 and 214 and the radar device 215.

The control unit 216 performs control under which the information that indicates the vehicle type and the speed of vehicle is mutually transmitted/received between the on-vehicle apparatus 203 of the own vehicle and the on-vehicle apparatus 203 of some other vehicle, using direct wireless communication.

Figure 24:
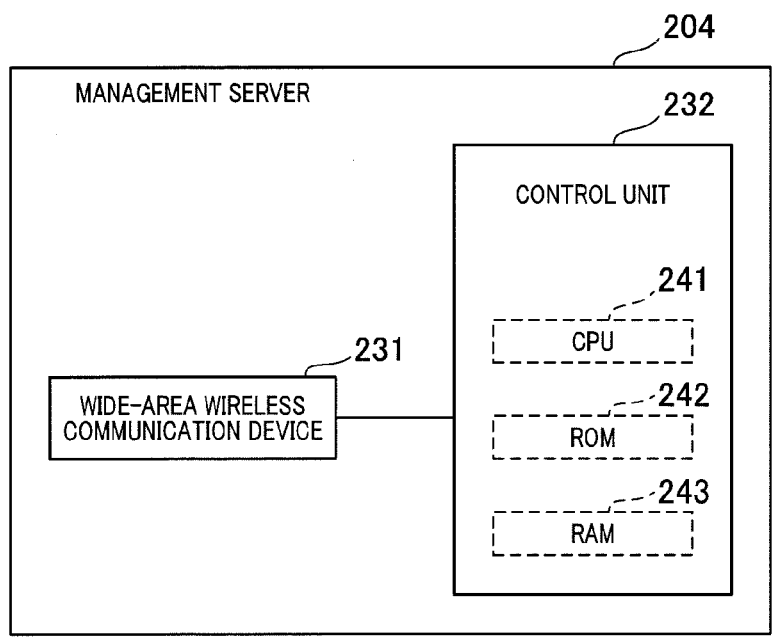
FIG. 24 is a block diagram illustrating a configuration of a management server in the wireless positioning system of FIG. 22.

As shown in FIG. 24, the management server 204 includes a wide-area wireless communication device 231 and a control unit 232.

Of these components, the wide-area wireless communication device 231 performs data communication with the reference station 202 and the on-vehicle apparatus 203 via the wide-area wireless communication network NW.

The control unit 232 includes a CPU 241, ROM 242 and RAM 243. The control unit 232 allows the CPU 241 to perform a process on the basis of a program stored in the ROM 242 to thereby control the wide-area wireless communication device 231. Also, the RAM 243 of the control unit 232 stores reference trajectory information regarding inter-vehicle distance (described later).

Hereinafter, the reference trajectory information regarding inter-vehicle distance is referred to as inter-vehicle distance reference trajectory information. The inter-vehicle distance reference trajectory information is provided for each combination of the vehicle type of the own vehicle and the vehicle type of a preceding vehicle.

In the wireless positioning system 201 configured as described above, the on-vehicle apparatus 203 performs an inter-vehicle distance estimation process that will be described latter. The management server 204 performs a trajectory update process that will be described later.

Figure 25:
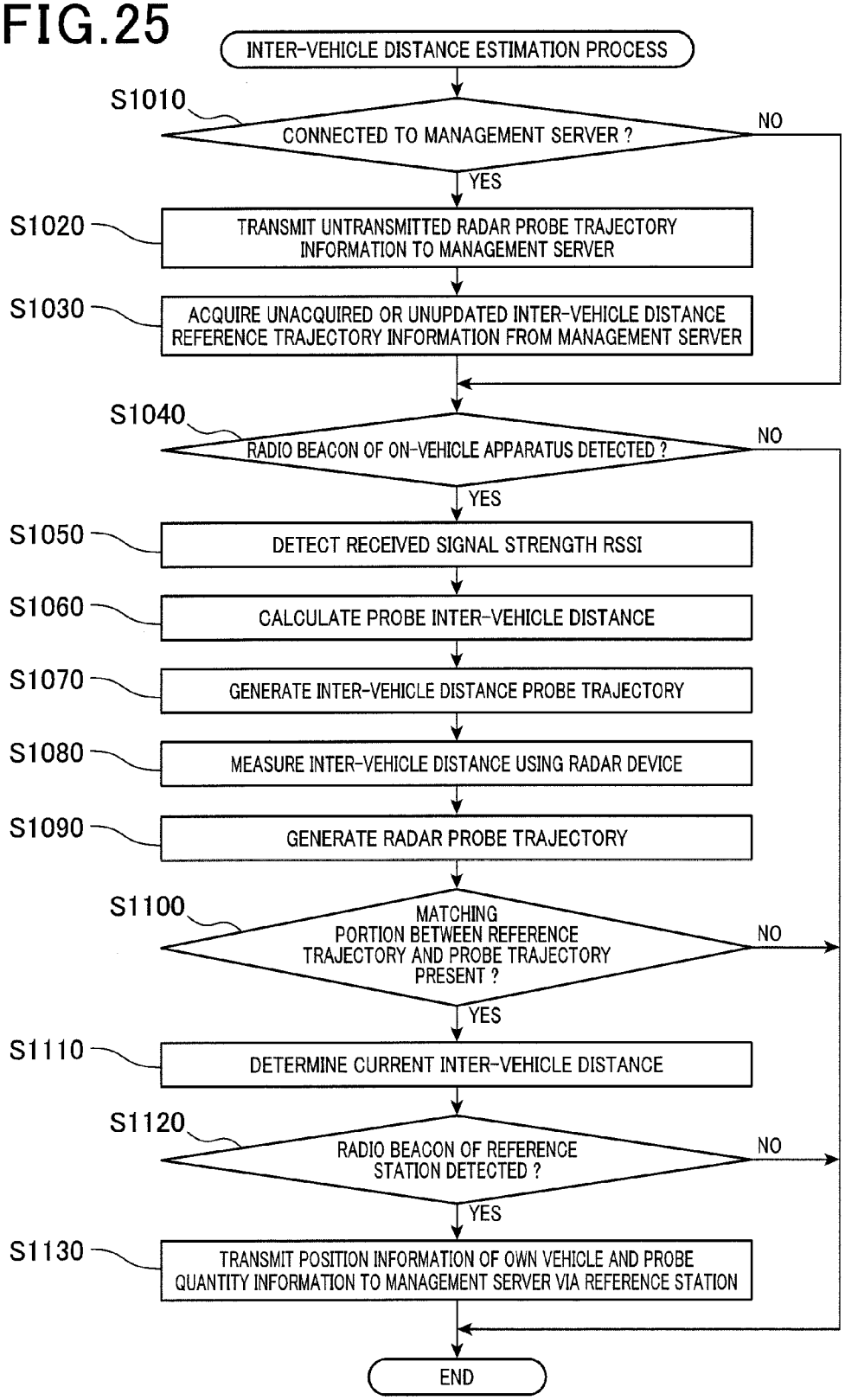
FIG. 25 is a flow diagram illustrating a position estimation process, according to the fifth embodiment.
Figure 26:
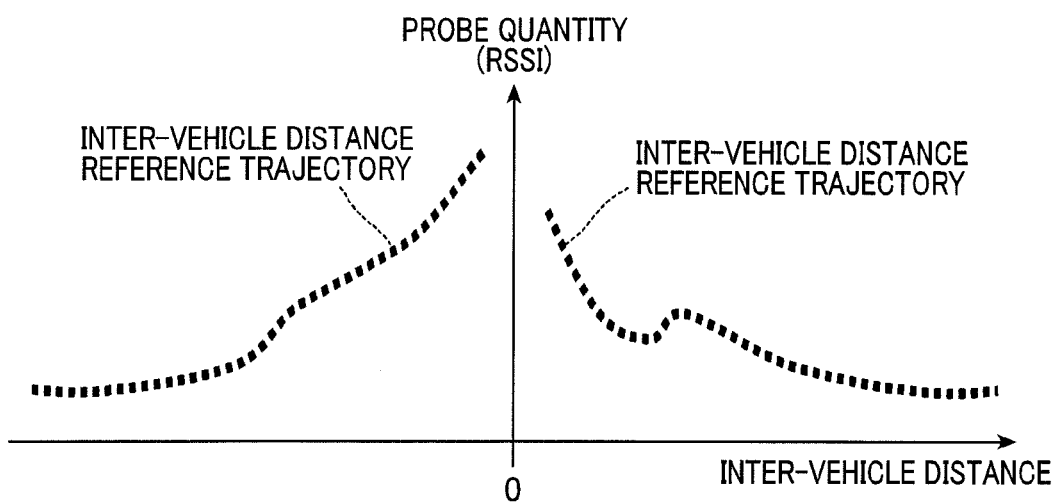
FIG. 26 is a diagram illustrating an inter-vehicle distance reference trajectory.
Figure 27:
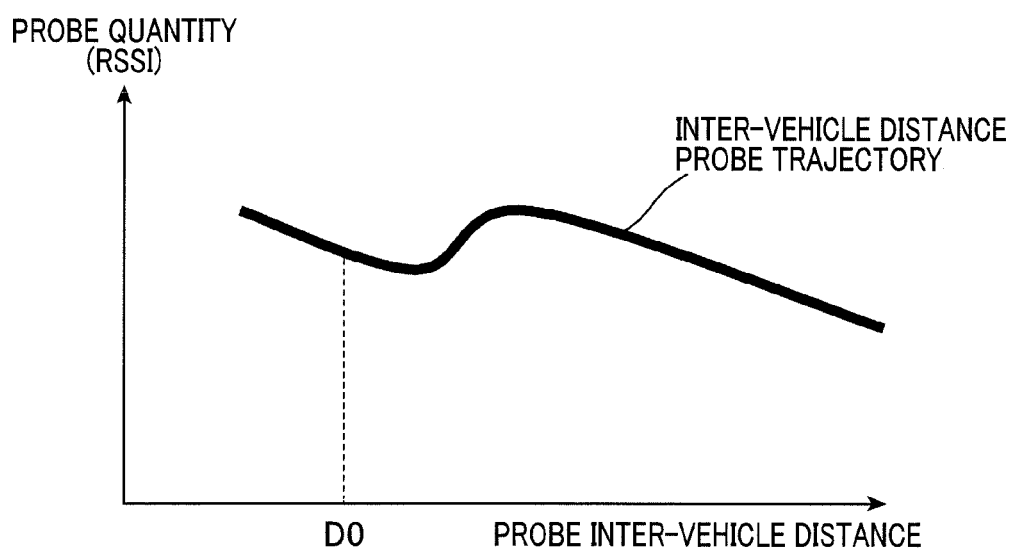
FIG. 27 is a diagram illustrating an inter-vehicle distance probe trajectory.

First, referring to FIG. 25, hereinafter are described steps of the inter-vehicle distance estimation performed by the CPU 221 of the on-vehicle apparatus 203. The inter-vehicle distance estimation process is repeatedly performed while the CPU 221 is activated.

When the inter-vehicle distance estimation process is performed, the CPU 221 determines, first, at step S1010, whether or not a connection is established with the management server 204 by the wide-area wireless communication device 214 so as to enable data communication.

If no connection is established with the management server 204 (NO at step S1010), control proceeds to step S1040. On the other hand, if connection is established with the management server 204 (YES at step S1010), control proceeds to step S1020.

At step S1020, if there is a radar probe trajectory (described later) not yet transmitted to the management server 204, the CPU 221 transmits radar probe trajectory information, which indicates an untransmitted radar probe trajectory, to the management server 4, together with vehicle type information indicative of the vehicle type of the own vehicle and preceding vehicle type information indicative of the vehicle type of a preceding vehicle.

Then, at step S1030, the CPU 221 acquires unacquired or unupdated inter-vehicle distance reference trajectory information from the management server 204 and stores the information in the RAM 223.

Then, control proceeds to step S1040. A reference trajectory related to an inter-vehicle distance (hereinafter referred to as inter-vehicle distance reference trajectory) indicates a relation of inter-vehicle distance to a preceding vehicle, with probe quantity of a radio beacon received from the preceding vehicle (see FIG. 26). The inter-vehicle distance reference trajectory is provided for each combination of the vehicle type of the own vehicle and the vehicle type of a preceding vehicle.

At step S1040, the CPU 221 determines whether or not a radio beacon from the on-vehicle apparatus 203 of some other vehicle has been detected. If no radio beacon has been detected (NO at step S1040), control proceeds to step S1120. On the other hand if a radio beacon has been detected (YES at step S1040), control proceeds to step S1050. At step S1050, the probe quantity (received signal strength RSSI in the present embodiment) of the detected radio beacon is detected.

At the same time, at step S1060, the CPU 221 calculates an inter-vehicle distance between the own vehicle and the preceding vehicle with reference to the time point when the radio beacon has initially been detected (hereinafter referred to as probe inter-vehicle distance).

Then, at step S1070, the CPU 221 generates a probe trajectory (see FIG. 27) that indicates a relation between probe quantity and probe inter-vehicle distance (hereinafter referred to as inter-vehicle distance probe trajectory).

The probe inter-vehicle distance is calculated on the basis of the information regarding the travelling speed of the own vehicle and the information regarding the travelling speed of the preceding vehicle that is acquired through direct wireless communication with the preceding vehicle.

For example, a radio beacon from the on-vehicle apparatus 203 of some other vehicle may be initially detected, and the inter-vehicle distance at this time is indicated by D0 (see FIG. 27) (corresponding to a predetermined time point).

Then, when the own vehicle decelerates or the preceding vehicle accelerates, the probe inter-vehicle distance becomes longer than D0, depending on the amount of change in the speed. Contrarily, when the own vehicle accelerates or the preceding vehicle decelerates, the inter-vehicle distance becomes shorter than D0, depending on the amount of change in the speed. However, since the value of D0 is unknown, the probe quantity cannot be correlated to the actual inter-vehicle distance in the inter-vehicle distance probe trajectory.

Then, at step S1080, the CPU 221 measures an inter-vehicle distance between the own vehicle and the preceding vehicle using the radar device 215 (hereinafter referred to as radar inter-vehicle distance). Then, at step S1090, the CPU 221 generates a probe trajectory that indicates a relation between probe quantity and radar inter-vehicle distance (hereinafter referred to as radar probe trajectory).

After that, at step S1100, the CPU 221 extracts the inter-vehicle distance reference trajectory information that is specified by the combination of the vehicle type of the own vehicle and the vehicle type of the preceding vehicle, from among a plurality of pieces of inter-vehicle distance reference trajectory information already acquired.

Then, the CPU 221 superimposes the inter-vehicle distance probe trajectory generated at step S1070 over the inter-vehicle distance reference trajectory indicated by the extracted inter-vehicle distance reference trajectory information to determine whether or not there is a matching portion with a degree of matching equal to or more than a preset trajectory match threshold.

If there is not a matching portion with a degree of matching equal to or more than the trajectory matching threshold (NO at step S1100), control proceeds to step S1120. On the other hand, if there is a matching portion with a degree of matching equal to or more than the trajectory matching threshold (YES at step S1100), control proceeds to step S1110.

At step S1100, the CPU 221 sets the value of D0 on the basis of the results of the superimposition between the inter-vehicle distance reference trajectory and the inter-vehicle distance probe trajectory, thereby correlating the probe quantity with the actual inter-vehicle distance in the inter-vehicle distance probe trajectory. Thus, the actual inter-vehicle distance is determined on the basis of the current probe quantity, and then control proceeds to step S1120.

At step S1120, the CPU 221 determines whether or not a radio beacon from the reference station 202 has been detected. If no radio beacon from the reference station 202 has been detected (NO at step S1120), the inter-vehicle distance estimation process is once ended. On the other hand, if a radio beacon from the reference station 202 has been detected (YES at step S1120), control proceeds to step S1130.

At step S1130, the CPU 221 transmits information to the management server 204 via the reference station 202. The information includes the information regarding the probe quantity of a radio beacon received from the on-vehicle apparatus 203 of some other vehicle (probe quantity information), the information regarding the current location of the own vehicle (own vehicle's current location information), the information regarding the vehicle type of the own vehicle (own vehicle's vehicle type information), the information regarding the vehicle type of the preceding vehicle (preceding vehicle's vehicle type information), and the information regarding the current time (current time information). Then, the inter-vehicle distance estimation process is once ended.

Figure 28:
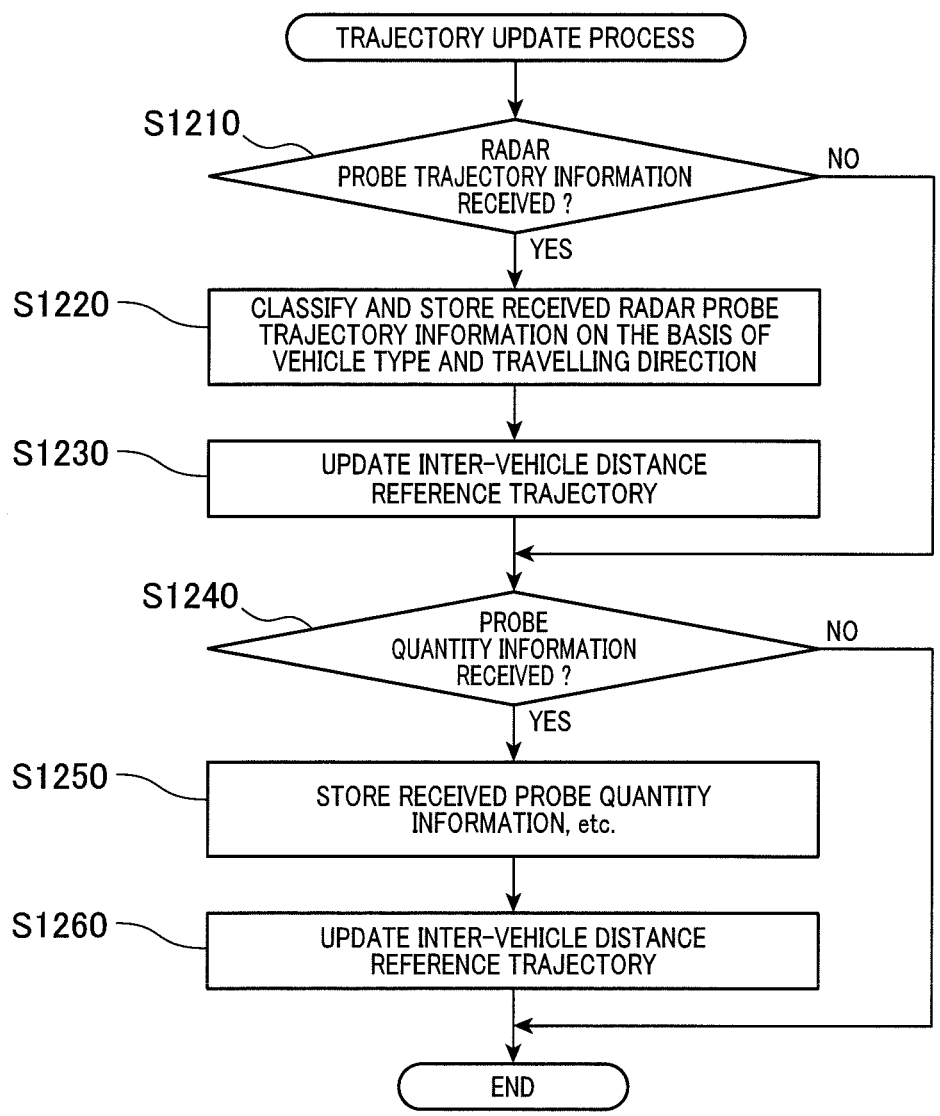
FIG. 28 is a flow diagram illustrating a trajectory update process, according to the fifth embodiment.

Referring to FIG. 28, hereinafter are described steps of the trajectory update process performed by the CPU 241 of the management server 204. The trajectory update process is repeatedly performed while the CPU 241 is activated.

When the trajectory update process is performed, the CPU 241 determines, first, at step S1210, whether or not radar probe trajectory information has been received from the on-vehicle apparatus 203.

If no radar probe trajectory information has been received (NO at step S1210), control proceeds to step S1240. On the other hand, if radar probe trajectory information has been received from the on-vehicle apparatus 203 (YES at step S1210), the CPU 241 classifies the received radar probe trajectory information on the basis of the combination of the vehicle type of the own vehicle and the vehicle type of the preceding vehicle and stores the classified data in the RAM 243.

Then, at step S1230, the CPU 241 updates the inter-vehicle distance reference trajectory in which the combination between the vehicle type of the own vehicle and the vehicle type of the preceding vehicle is the same as that of the radar probe trajectory information added at step S1220, on the basis of the radar probe trajectory information added at step S1220.

Then, control proceeds to step S1240. The update is carried out by statistically processing data on the basis of conditions such as of the vehicle type of the own vehicle, the vehicle type of the preceding, the road curvature and the lane.

At step S1240, the CPU 241 determines whether or not probe quantity information has been received from the on-vehicle apparatus 203. If no probe quantity information has been received (NO at step S1240), the trajectory update process is once ended. On the other hand, if probe quantity information has been received from the on-vehicle apparatus 203 (YES at step S1240), control proceeds to step S1250.

At step S1250, the CPU 241 stores the received probe quantity information, together with the concurrently received own vehicle's current location information, own vehicle's vehicle type information, preceding vehicle's vehicle type information and current time information.

Then, at step S1260, the inter-vehicle distance reference trajectory is updated on the basis of the information stored at step S1250. Then, the trajectory update process is once ended. The update is carried out by statistically processing data on the basis of conditions such as of the vehicle type of the own vehicle, the vehicle type of the preceding, the road curvature and the lane.

Figure 29:
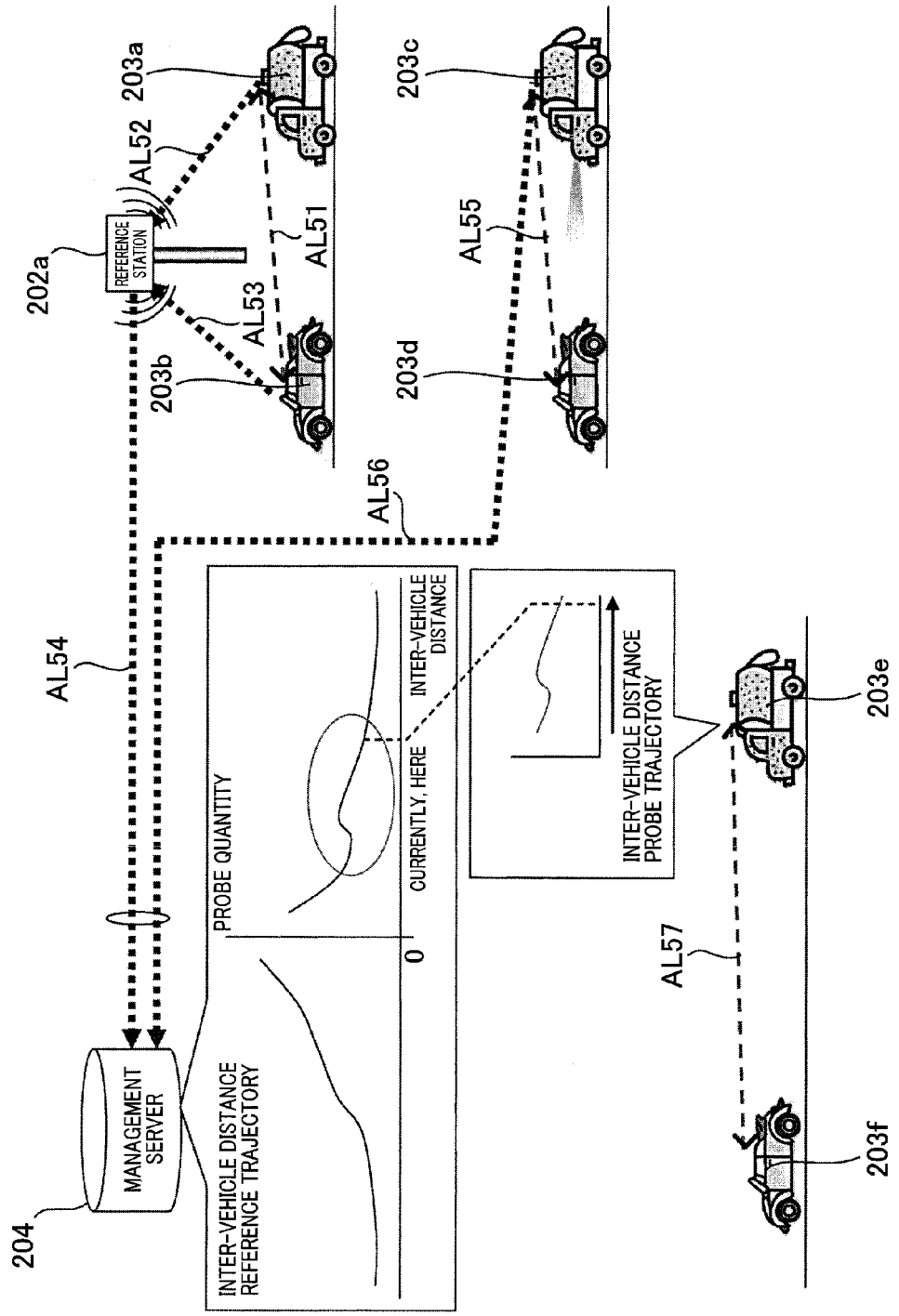
FIG. 29 is a diagram illustrating a specific example of inter-vehicle distance estimation, according to the fifth embodiment.

Referring to FIG. 29, hereinafter is described a specific example of the inter-vehicle distance estimation performed in the wireless positioning system 201 configured as described above.

As shown in FIG. 29, a vehicle installing the on-vehicle apparatus 203a (hereinafter referred to as first vehicle) and a vehicle installing the on-vehicle apparatus 203b (hereinafter referred to as second vehicle) travel near the reference station 202a. The second vehicle travels ahead of the first vehicle, while direct wireless communication is performed therebetween (see the arrow AL51).

In this case, each of the on-vehicle apparatuses 203a and 203b transmits probe quantity information and the like to the management server 204 via the reference station 202a (see the arrows AL52, AL53 and AL54).

Further, a vehicle installing the on-vehicle apparatus 203d (hereinafter referred to as fourth vehicle) travels ahead of a vehicle installing the on-vehicle apparatus 203c (hereinafter referred to as third vehicle). No reference station 202 is set up in the vicinity of the third and fourth vehicles.

The third vehicle detects an inter-vehicle distance between the third and fourth vehicles using the radar device, while performing direct wireless communication with the fourth vehicle (see the arrow AL55). In this case, the on-vehicle apparatus 203c transmits probe trajectory information and the like to the management server 204 (see the arrow AL56).

Then, the management server 204 generates an inter-vehicle distance trajectory and updates the inter-vehicle distance trajectory using the probe quantity information, the probe trajectory information and the like received from the on-vehicle apparatus 203.

Further, a vehicle installing the on-vehicle apparatus 203f (hereinafter referred to as sixth vehicle) travels ahead of a vehicle installing the on-vehicle apparatus 203e (hereinafter referred to as fifth vehicle). No reference station 202 is set up in the vicinity of the fifth and sixth vehicles.

Direct wireless communication is performed between the fifth and sixth vehicles (see the arrow AL57). In this case, the fifth vehicle compares the inter-vehicle distance probe trajectory generated through the direct wireless communication with the sixth vehicle, with the inter-vehicle distance reference trajectory already acquired from the management server 204. Thus, without using the radar device, the inter-vehicle distance between the fifth and sixth vehicles can be estimated.

In the on-vehicle apparatus 203 configured as described above, the direct wireless communication device 213 performs direct wireless communication to receive data transmitted from the on-vehicle apparatus 203 of some other vehicle, which transmits data through radio transmission. Then, the received signal strength RSSI of the direct wireless communication device 213 is detected (step S1050).

Further, the RAM 223 stores inter-vehicle distance reference trajectory information. In this information, two or more points are provided to show a relation of the received signal strength RSSI with the relative distance between the on-vehicle apparatus 203 of some other vehicle and the on-vehicle apparatus 203 of the own vehicle. In this case, the received signal strength RSSI shows the strength when the data transmitted from the on-vehicle apparatus 203 of some other vehicle is received by the direct wireless communication device 213 through radio reception.

Further, an inter-vehicle distance (probe inter-vehicle distance) between the own vehicle and the preceding vehicle is calculated with reference to the time point when a radio beacon has initially been detected (step S1060). Then, inter-vehicle distance probe trajectory information is generated, which indicates a relation of a plurality of received signal strengths RSSI of the direct wireless communication device 213, to a plurality of probe inter-vehicle distances (step S1070).

The inter-vehicle distance reference trajectory information is compared with the inter-vehicle distance probe trajectory information to determine a relation between relative distance and probe inter-vehicle distance (step S1100).

Then, an inter-vehicle distance to the on-vehicle apparatus 203 of some other vehicle is determined on the basis of the relation between the inter-vehicle distance reference trajectory information and the inter-vehicle distance probe trajectory information and the currently detected received signal strength RSSI (step S1110).

Thus, the on-vehicle apparatus 203 of the own vehicle, when it moves in the vicinity of the on-vehicle apparatuses 203 of other vehicles, can perform direct wireless communication with one on-vehicle apparatus 203 corresponding to the inter-vehicle distance trajectory information (i.e. the on-vehicle apparatus 203 installed in some other vehicle). Thus, a relative distance between the on-vehicle apparatus 203 of the own vehicle and some other vehicle can be determined.

Inter-vehicle distance reference trajectory information is acquired from the management server 204 by performing wireless communication, via the wide-area wireless communication network NW, with the management server 204 that manages the inter-vehicle distance reference trajectory information (step S1030).

Thus, a necessary piece of inter-vehicle distance reference trajectory information can be acquired from the management server 204, from among a number of pieces of inter-vehicle distance reference trajectory information, which are provided on the basis of combination between the vehicle type of the own vehicle and the vehicle type of a preceding vehicle. Accordingly, the data storage area of the on-vehicle apparatus 203 can be saved.

The on-vehicle apparatus 203 is installed in a vehicle (the own vehicle) that travels on a road. Thus, the own vehicle installs the radar device 215 that measures a relative distance to a vehicle (preceding vehicle) travelling ahead of the own vehicle. The on-vehicle apparatus 203 of the own vehicle generates radar probe trajectory information that indicates a relation between detected received signal strength RSSI and radar inter-vehicle distance measured by the radar device 215 (step S1090).

The on-vehicle apparatus 203 of the own vehicle performs wireless communication via the wide-area wireless communication network NW to transmit the generated radar probe trajectory information to the management server 204 (step S1020). Thus, the management server 204 that manages the inter-vehicle distance reference trajectory information uses the newly acquired radar probe trajectory information to update the inter-vehicle distance reference trajectory information.

In the embodiment described above, the on-vehicle apparatus 203 is the wireless communication apparatus of the present invention. Likewise, the on-vehicle apparatus 203 of some other vehicle is the radio transmitter; the direct wireless communication device 213 is the radio communicating means or unit; step S1050 is the detecting means or unit; the RAM 223 is the reference information storing means or unit; step S1060 is the distance measuring means or unit; step S1070 is the first generating means or unit; step S1100 is the relation determining means or unit; and step S1110 is the position determining means or unit Further, the received signal strength RSSI is the radio reception condition of the present invention. Likewise, the "relative distance between the on-vehicle apparatus 203 of some other vehicle and the on-vehicle apparatus 203 of the own vehicle" is the position related information; the inter-vehicle distance reference trajectory information is the relation reference information (relation reference information); the probe inter-vehicle distance is the relative distance information (relative distance related information); and the inter-vehicle distance probe trajectory information is the first relation information (first relation measurement information).

Furthermore, step S1030 is the third reference information acquiring means or unit. Likewise, step S1090 is the second generating means or unit; step S1020 is the third measurement information transmitting means or unit; the radar device 215 is the relative distance measurement apparatus; the radar probe trajectory information is the second relation information (second relation measurement information); and the management server 204 is the second management apparatus.

Sixth Exemplary Embodiment

Next, a sixth embodiment of the present invention is described with reference to FIGS. 30 and 31. In the sixth embodiment, only the differences from the first embodiment are described. In the sixth embodiment, the components identical with or similar to those in the first embodiment are given the same reference numerals for the sake of omitting unnecessary explanation.

The wireless positioning system 1 of the sixth embodiment is different from the first embodiment in that there are some changes in the processing steps performed by the reference station 2 and in the steps of the position estimation process. The remaining steps are similar to those of the first embodiment.

Upon reception of the information that indicates the current location of the vehicle (vehicle current location information) from the on-vehicle apparatus 3, the reference station 2 carries out a step of including the received vehicle current location information into a radio beacon.

Except for this additional step, the remaining steps are similar to those of the first embodiment. In other words, the reference station 2 periodically transmits, to the vehicles around it, the radio beacon that includes the identification information of the reference station 2 and the received vehicle current location information, using the direct wireless communication function.

Figure 30:
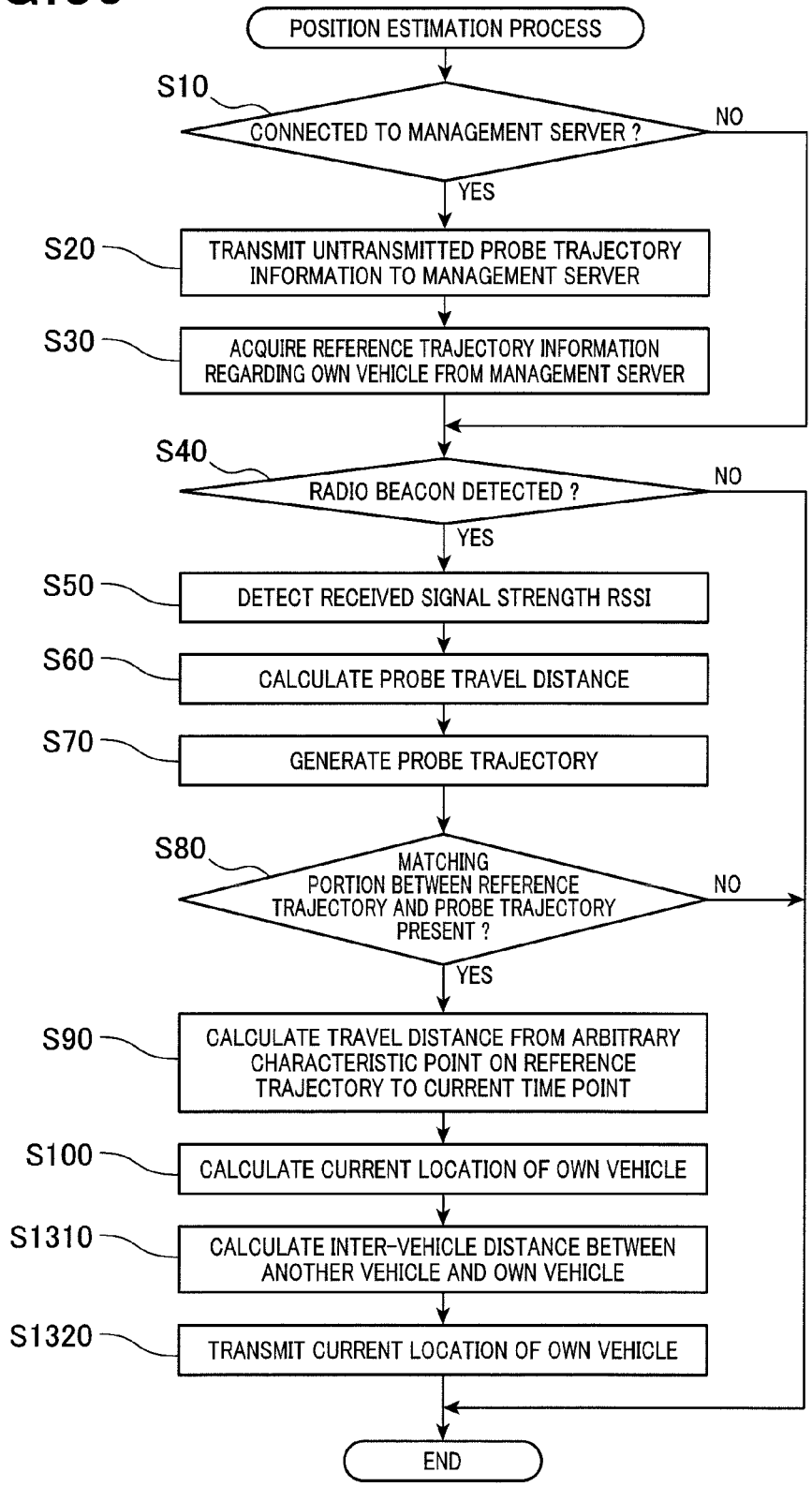
FIG. 30 is a flow diagram illustrating a position estimation process, according to a sixth embodiment of the present invention.

As shown in FIG. 30, the position estimation process of the sixth embodiment is similar to that of the first embodiment except that steps S1310 and S1320 have been added.

Specifically, when step S100 is finished, control proceeds to step S1210. At step S1310, the CPU 21 of the on-vehicle apparatus 3 refers to the vehicle current location information included in the radio beacon that has been detected at step S40 and the current location of the own vehicle calculated at step S100 to calculate an inter-vehicle distance between the vehicle corresponding to the vehicle current location information and the own vehicle.

Then, at step S1320, the CPU 21 transmits information that indicates the current location of the own vehicle (own vehicle's current location information) calculated at step S100 to the reference station 2 and then once ends the position estimation process.

Figure 31:
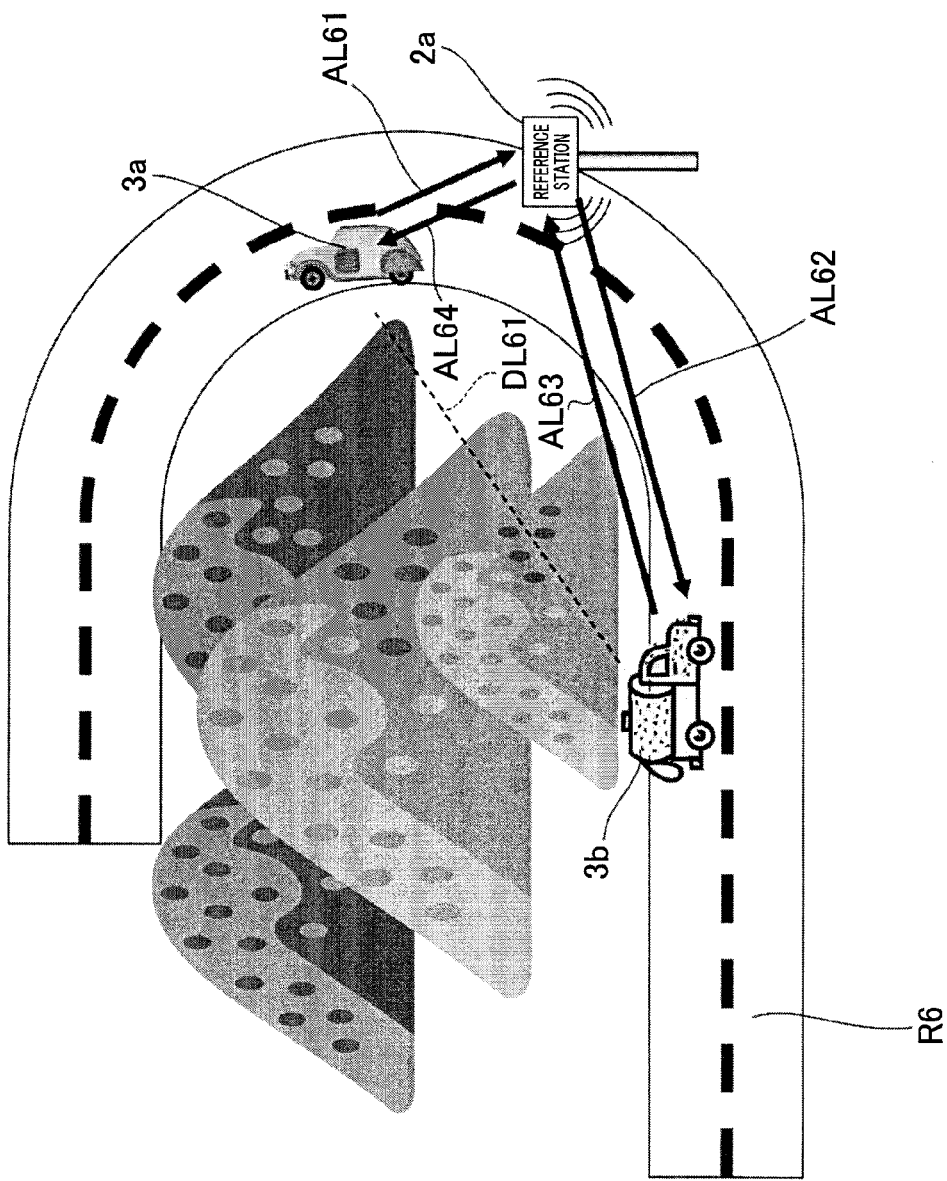
FIG. 31 is a diagram illustrating a specific example of inter-vehicle distance estimation, according to the sixth embodiment.

Referring to FIG. 31, hereinafter is described a specific example of the inter-vehicle distance estimation performed in the wireless positioning system 1 configured as described above.

As shown in FIG. 31, a vehicle installing the on-vehicle apparatus 3*a* (hereinafter referred to as first vehicle) and a vehicle installing the on-vehicle apparatus 3*b* (hereinafter referred to as second vehicle) travel on a road R6 in the vicinity of the reference station 2*a*.

The first vehicle travels ahead of the second vehicle. Further, the first vehicle travels on a curve of the road R6, while the second vehicle travels just before the curve. There is an obstacle on a line connecting between the first and second vehicles (see the broken line DL61). In this case, if the second vehicle installs a radar device, it is difficult for the second vehicle to accurately estimate a distance between the first and second vehicles (inter-vehicle distance).

In this situation, however, the first vehicle is able to transmit its own vehicle's current location information to the reference station 2*a* (see the arrow AL61) and the reference station 2*a* is able to transmit the own vehicle's current location information of the first vehicle to the second vehicle (see the arrow AL62). Thus, the second vehicle is able to accurately estimate the distance between the first and second vehicles.

Further, the second vehicle may transmit its own vehicle's current location information to the reference station 2*a* (see the arrow AL63) and the reference station 2*a* may transmit the own vehicle's current location information of the second vehicle to the first vehicle (see the arrow AL64). Thus, the first vehicle is able accurately estimate the distance between the first and second vehicles.

The on-vehicle apparatus 3 configured as described transmits the own vehicle's current location information to the reference station 2, using the direct wireless communication device 13, the reference station 2 having a function of receiving the own vehicle's current location information through direct wireless communication and a function of transmitting the received own vehicle's current location information through direct wireless communication (step S1320). Thus, the on-vehicle apparatus 3 is able to transmit/receive own vehicle's current location information to/from the reference station 2 through direct wireless communication.

Accordingly, the on-vehicle apparatus 3 is able to determine an inter-vehicle distance to another on-vehicle apparatus 3 positioned in the vicinity of the same reference station 2.

In the embodiment described above, step S1320 is the position information transmitting means or unit. Likewise, the own vehicle's current location information is the apparatus current location information.

Seventh Exemplary Embodiment

Next, a seventh exemplary embodiment of the present invention is described with reference to FIG. 32, focusing on the differences from the third embodiment. In the seventh embodiment, the components identical with or similar to those in the third embodiment are given the same reference numerals for the sake of omitting unnecessary explanation.

Figure 32:
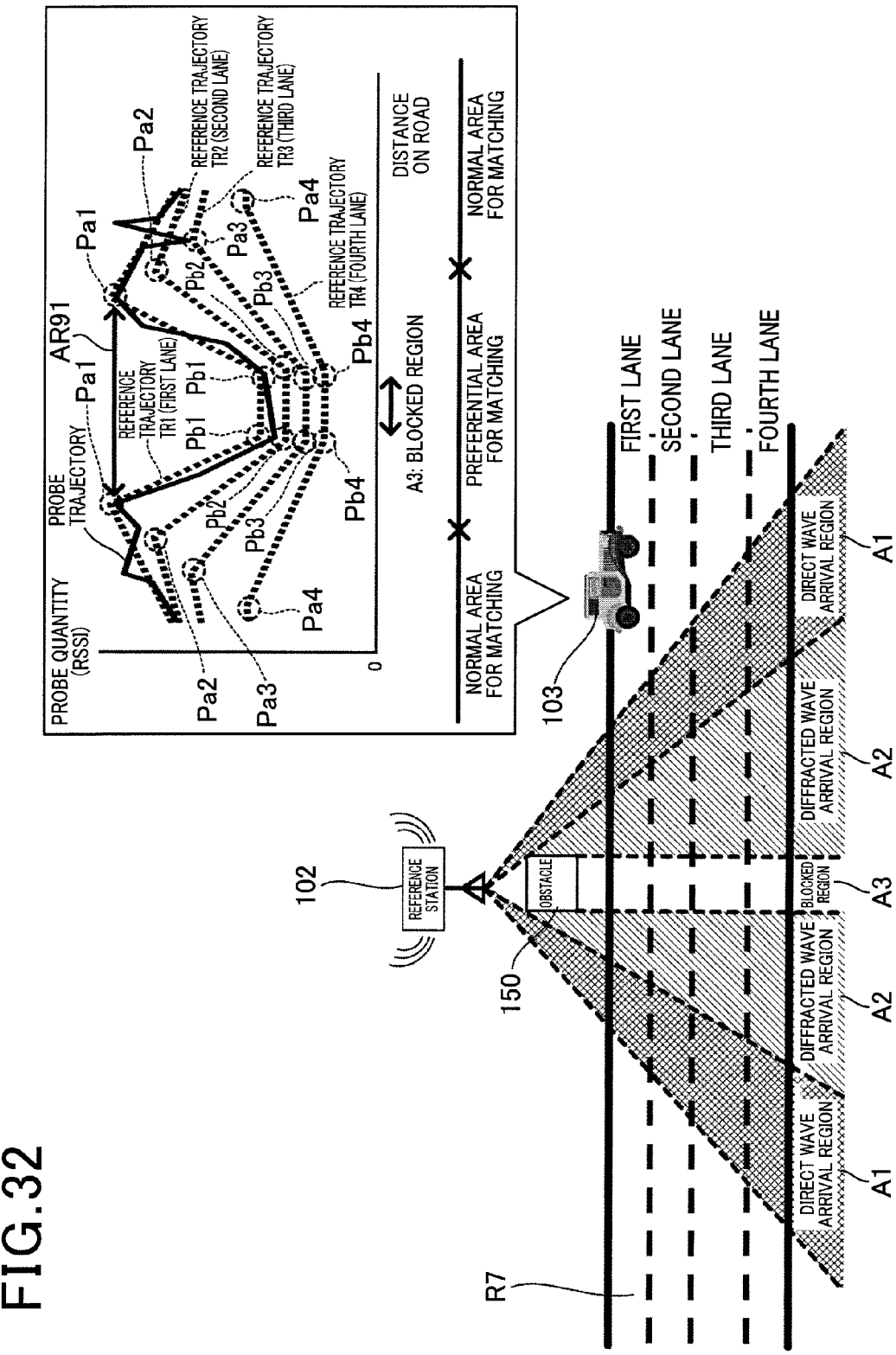
FIG. 32 is a diagram illustrating a specific example of position estimation, according to a seventh embodiment of the present invention.

As shown in FIG. 32, the wireless positioning system 101 of the seventh embodiment is different from the third embodiment in that the reference station 102 is set up along an eight-lane (four lanes each way) road R7, an obstacle 150 is provided between the reference station 102 and the road R7, and the position estimation process has been changed. The remaining configuration is the same as that of the third embodiment.

Due to the presence of the obstacle 150 between the reference station 102 and the road R7, a direct wave arrival region A1, a diffracted wave arrival region A2 and a blocked region A3 are formed above the road R7.

The direct wave arrival region A1 (hereinafter also just referred to as region A1) is a region for the arrival of direct waves that are not blocked by the obstacle 150, among the radio beacons transmitted from the reference station 102. The reference station 102 transmits the radio beacons via radio waves.

The diffracted wave arrival region A2 (hereinafter also just referred to as region A2) is a region for the arrival of diffracted waves that are diffracted by the obstacle 150, among the radio beacons transmitted from the reference station 102.

The blocked region A3 (hereinafter also just referred to as region A3) is a region where neither the direct waves nor the diffracted waves arrive.

The diffracted wave arrival region A2 is formed on both sides of the blocked region A3 along the travelling direction on the road R7. With respect to the region A2 formed on each side of the blocked region A3, the direct wave arrival region A1 is formed on the other side of the region A2, which is opposite to the side where the blocked region A3 is formed.

The RAM 123 of the control unit 112 (see FIG. 11) stores reference trajectory information regarding the reference station 102 that installs the control unit 112, being classified on the basis of vehicle type and travelling direction of vehicles. Each piece of reference trajectory information includes reference trajectories concerning first to fourth lanes that configure the four lanes on one way (see reference trajectories TR1, TR2, TR3 and TR4 in FIG. 32).

The reference trajectory TR1 (TR2, TR3 or TR4) indicates that the probe quantity gradually increases as the vehicle travelling on the first (second, third or fourth) lane of the road R7 approaches the reference station 2. Then, at the boundary between the region A1 and the region A2 on the first (second, third or fourth) lane, the reference trajectory TR1 bends in a direction of decreasing the probe quantity as the vehicle approaches the reference station 2 (see the bending point Pa1 (Pa2, Pa3 or Pa4) in FIG. 32).

Further, the reference trajectory TR1 (TR2, TR3 or TR4) indicates that, as the vehicle travels away from the boundary between the regions A1 and A2 toward the reference station 2, the probe quantity gradually decreases. Furthermore, the reference trajectory TR1 bends at the boundary between the regions A2 and A3 on the first (second, third or fourth) lane (bending point Pb1 (Pb2, Pb3 or Pb4) in FIG. 32) and then indicates that the probe quantity is fixed in the region A3.

The position estimation process of the seventh embodiment is the same as that of the third embodiment except that step S370 has been changed.

Specifically, step S370 is different from that of the third embodiment in that the CPU 141 of the on-vehicle apparatus 103 determines whether or not a probe trajectory matches a reference trajectory.

More specifically, the CPU 141 sets preferential and normal areas for matching in each of the reference trajectories TR1, TR2, TR3 and TR4 (FIG. 32 shows preferential and normal areas for matching in the reference trajectory TR1). The preferential area is set so as to be specific to each of the reference trajectories TR1, TR2, TR3 and TR4. In this case, the preferential area for matching is set for each of the reference trajectories TR1, TR2, TR3 and TR4 so as to include all of the regions A2 and A3. The normal area for matching is also set so as to be specific to each of the reference trajectories TR1, TR2, TR3 and TR4. In each of the reference trajectories TR1, TR2, TR3 and TR4, the normal area for matching corresponds to the area other than the preferential area for matching.

Then, the probe trajectory is superimposed over the reference trajectory, followed by calculating a difference between the probe quantity of the reference trajectory and that of the probe trajectory at a plurality of points on the reference trajectory (hereinafter the difference is referred to as probe quantity difference). Further, the CPU 141 calculates an inverse number for each of the calculated probe quantity differences, followed by multiplying the inverse number with a predetermined weight coefficient.

Then, the CPU 141 calculates an average of the multiplied values at the plurality of points on the reference trajectory to use the average as a degree of matching. The weight coefficient in the preferential area for matching is ensured to be larger than that of the normal area for matching.

The wireless positioning system 101 configured as described above includes the obstacle 150 between the reference station 102 and the road R7 laid around the reference station 102. In this case, the obstacle 150 blocks the radio waves propagated from the reference station 102 for transmission of the radio beacons.

Accordingly, the reference trajectory TR1 (TR2, TR3 and TR4) indicates that the probe quantity gradually increases as the vehicle travelling on the first (second, third or fourth) lane of the road R7 approaches the reference station 2. Then, at the boundary between the region A1 and the region A2 on the first (second, third or fourth) lane, the reference trajectory TR1 bends in a direction of decreasing the probe quantity as the vehicle approaches the reference station 2 (see bending point Pa1 (Pa2, Pa3 or Pa4) in FIG. 32). The bending point Pa1, Pa2, Pa3 or Pa4 is generated at the boundary between the regions A1 and A2.

The positions on the road R7 corresponding to the bending points Pa1, Pa2, Pa3 and Pa4 of the reference trajectories TR1, TR2, TR3 and TR4, respectively, are unlikely to be affected by the ambient reflection (e.g., reflection of radio waves from the buildings around the reference station 102) and thus are stable. Specifically, the bending point Pa1, Pa2, Pa3 or Pa4 will have only a small variation in the position in the travelling direction of the vehicle on the road R7 and in the direction perpendicular to the travelling direction (i.e. in the direction from the first lane toward the fourth lane). Also, the bending point Pa1, Pa2, Pa3 or Pa4 will have only a small variation attributed to the difference in the vehicle type.

This is because the probe quantity of the direct waves becomes larger than the ambient reflection owing to the fact that the reference station 102 is set up near the road R7, and because the bending points are originated from the direct waves having such a large probe quantity.

Thus, when bending points are generated in a generated probe trajectory, the on-vehicle apparatus 103 superimposes the bending points on the probe trajectory over those generated on the reference trajectory TR1, TR2, TR3 or TR4 to accurately estimate the current location in the on-vehicle apparatus 103 and the lane of the road R7, on which the vehicle that installs the on-vehicle apparatus 103 (own vehicle) travels.

For example, the probe trajectory shown in FIG. 32 matches the reference trajectory TR1 at the bending point Pa1. Accordingly, the vehicle that installs the on-vehicle apparatus 103 is estimated to travel on the first lane.

In the comparison between the reference trajectory information and the probe trajectory information, the on-vehicle apparatus 103 determines a relation between reference travel distance and probe travel distance, using the results of the comparison performed when the position on the road R7 in the reference trajectory information is included in the preferential area for matching, in preference to the results of the comparison performed when the position is not included in the preferential area for matching (step S370).

Accordingly, the estimation of the current location of the on-vehicle apparatus 103 and the driving lane is hardly affected by the results of comparison performed in the normal area for matching that has lower accuracy in the estimation of these data than in the preferential area for matching. Thus, the estimation accuracy of the current location of the on-vehicle apparatus 103 and the driving lane is maintained.

Further, since the reference station 102 transmits the radio beacon via radio waves, the on-vehicle apparatus 103 is unlikely to be affected by the weather in detecting the probe quantity of the radio beacon.

Also, the on-vehicle apparatus 103 calculates inverse numbers of the probe quantity differences at a plurality of points on the reference trajectory TR1, TR2, TR3 or TR4, as parameters that indicate a degree of matching between the probe quantities of the reference trajectory TR1, TR2, TR3 or TR4 and the probe quantities of the probe trajectory.

At the same time, the on-vehicle apparatus 103 multiplies each of the inverse numbers of the probe quantity differences calculated at the plurality of points on the reference trajectory TR1, TR2, TR3 or TR4 with a weight coefficient that is predetermined on the basis of the corresponding point on the reference trajectory.

Then, using the plurality of multiplied values, the on-vehicle apparatus 103 determines the relation between reference travel distance and probe travel distance.

Further, the weight coefficient in the case where the points on the reference trajectory TR1, TR2, TR3 or TR4 are included in the preferential area for matching is ensured to be larger than the weight coefficient in the case where the points are not included in the preferential area for matching.

Thus, with such a simple method of changing the weight coefficient between the preferential area for matching and areas other than this, the comparison results in the case where the points are included in the preferential area for matching can be used in preference to the comparison results in the case where the points are not included in the preferential area for matching.

In the exemplary embodiment described above, the diffracted wave arrival region A2 and the blocked region A3 are the direct wave non-arrival region of the present invention. Likewise, the preferential area for matching is the preferential area; and the inverse number of a probe quantity difference is the parameter that indicates a degree of matching.

Various embodiments of the present invention have been described so far. However, the present is not limited to these embodiments but may be modified in various manners as far as the modifications fall within a technical scope of the present invention.

For example, in the above embodiments, the received signal strength RSSI is used as a probe quantity. Alternative to this, TOF (time of flight) or incoming angle of a radio wave may be used as a probe quantity.

In the above embodiments, reference trajectory information is provided for each vehicle type. Alternative to this, reference trajectory information may be provided for each type of direct wireless communication device installed in the on-vehicle apparatus.

In the above embodiments, a reference trajectory is updated by determining whether the probe trajectory is of the first lane or of the second lane on the basis of speed information and steering angle information. Alternative to this, when the statistics of probe trajectory converge on a plurality of trajectories, the converged trajectories may be registered as being the reference trajectories of the respective lanes.

In the above embodiments, an average of probe trajectories is calculated for the probe trajectories of each classification and the average value is used as a reference trajectory. Alternative to this, a reference trajectory may be derived as a trajectory that maximizes the statistical indicator of a degree of similarity, with respect to a group of probe trajectories received in the past.

In the seventh exemplary embodiment, the obstacle 150 is provided between the reference station 102 and the road R7. However, as shown in FIG. 33, in an indoor site (e.g., indoor parking area) where a structure such as of ferroconcrete having high blocking properties is built, the reference station 102 may be provided so that the structure (the post 160 in FIG. 33) is located between the reference station 102 and a region where positioning is performed.

Figure 33:
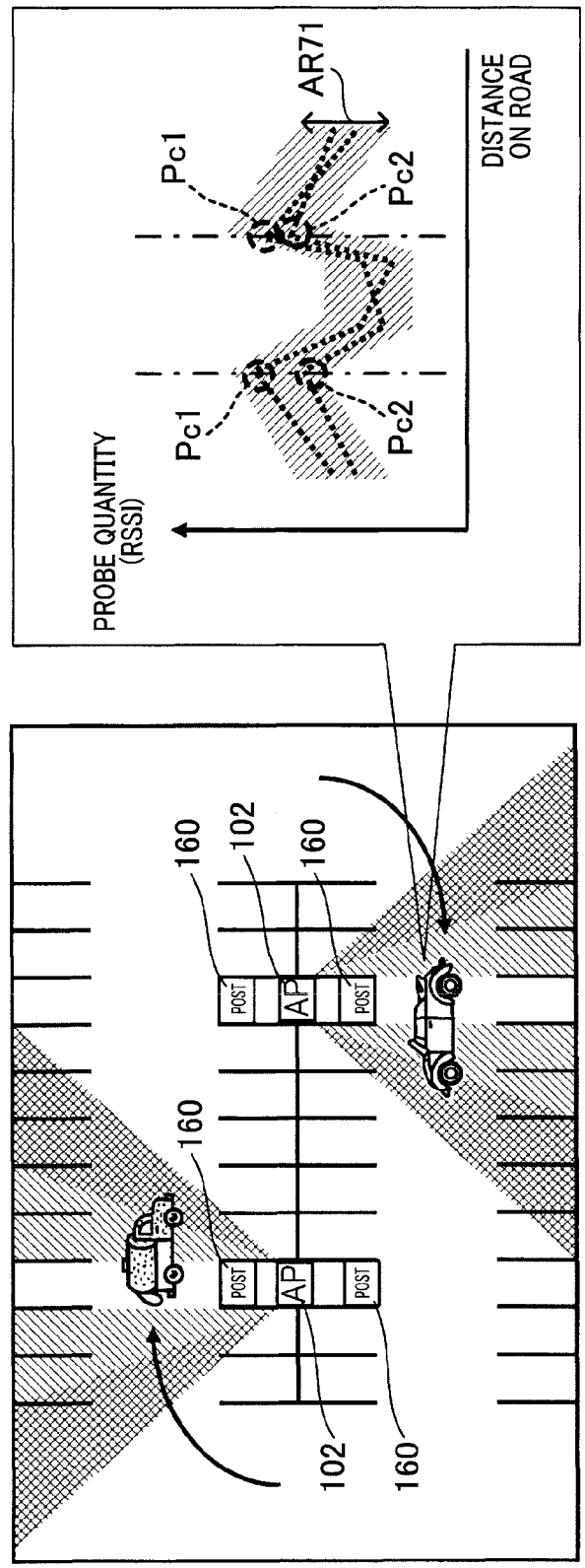
FIG. 33 is a two-dimensional diagram illustrating an indoor parking area in which an arrangement of a reference station is shown, according to another embodiment of the present invention.

In an indoor environment that causes lots of reflections, the received signal strength RSSI is greatly influenced by the vehicles around there, causing large variation in a probe trajectory (refer to the arrow AR71 in FIG. 33). However, when a region for blocking direct waves is provided in a region where decay of the direct waves from the reference station 102 is small (a region near the reference station 102), the characteristic points (refer to the bending points Pc1 and Pc2 in FIG. 33) can be extracted with a contrast higher than the environmental factors.

In the seventh exemplary embodiment, the obstacle 150 is provided being distanced from the reference station 102. In setting up the reference station 102 and the obstacle 150, the reference station 102 may be set up first and then the obstacle 150 may be set up so as to be located between the reference station 102 and the road. Alternatively, when the obstacle 150 is already set up near the road before setting up the reference station 102, the reference station 102 may be set up so that the obstacle 150 is located between the reference station 102 and the road.

Figure 34:
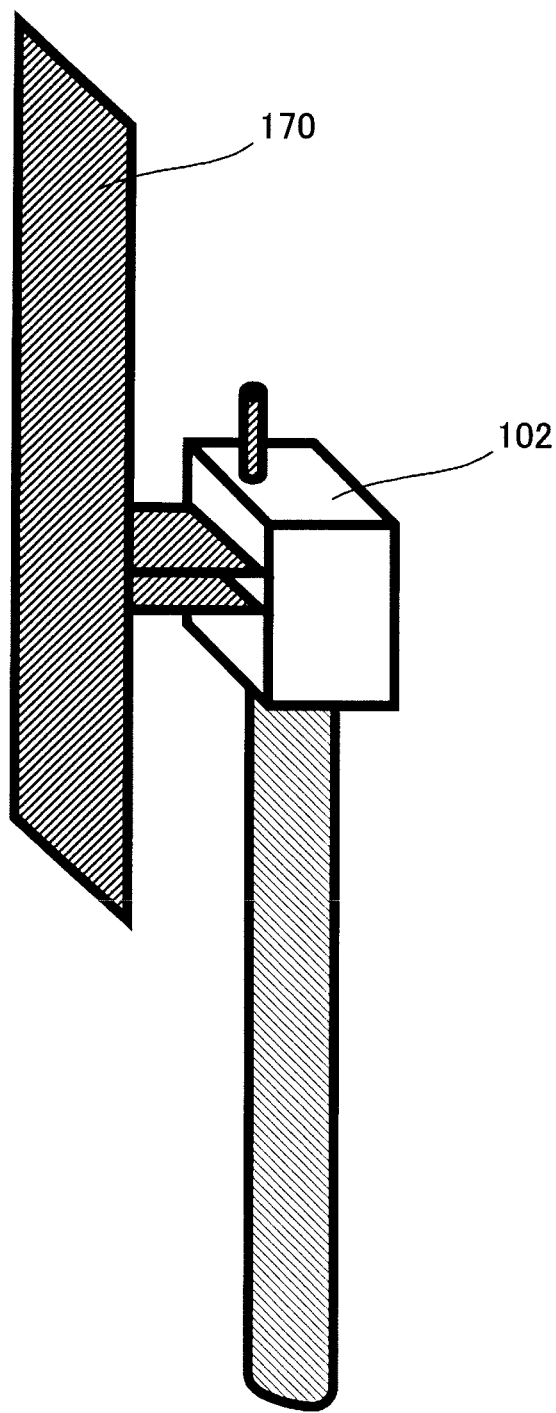
FIG. 34 is a perspective diagram illustrating a configuration of a reference station, according to another embodiment of the present invention.

Further, as shown in FIG. 34, the obstacle 150 may be replaced by a blocking plate 170. The blocking plate 170 may be connected to the reference station 102 so as to be located between the reference station 102 and the road R7. Thus, the reference station 102 and the obstacle are integrated.

In this way, the positional relationship between the reference station 102 and the obstacle is fixed to thereby suppress variation in the positions of the bending points in the reference trajectory TR1, TR2, TR3 or TR4. As a result, the accuracy is enhanced in the estimation of the current location of the on-vehicle apparatus 103 and the travelling lane.

In the seventh exemplary embodiment, radio beacons are transmitted via radio waves. Alternative to this, radio beacons may be transmitted via optical waves. Since optical waves have higher straightness than radio waves, the influence of the ambient reflections can be further mitigated. However, optical waves are likely to be influenced by weather. In order to avoid the influence of weather as much as possible, radio beacons may be transmitted via sonic waves.

In the seventh exemplary embodiment, the reference trajectories TR1, TR2, TR3 and TR4 are each superimposed over a probe trajectory to determine which one of the reference trajectories TR1, TR2, TR3 and TR4 the probe trajectory matches. Alternative to this, a path that the vehicle travels between the lanes may be estimated on the basis of the reference trajectories TR1, TR2, TR3 and TR4.

Figure 35:
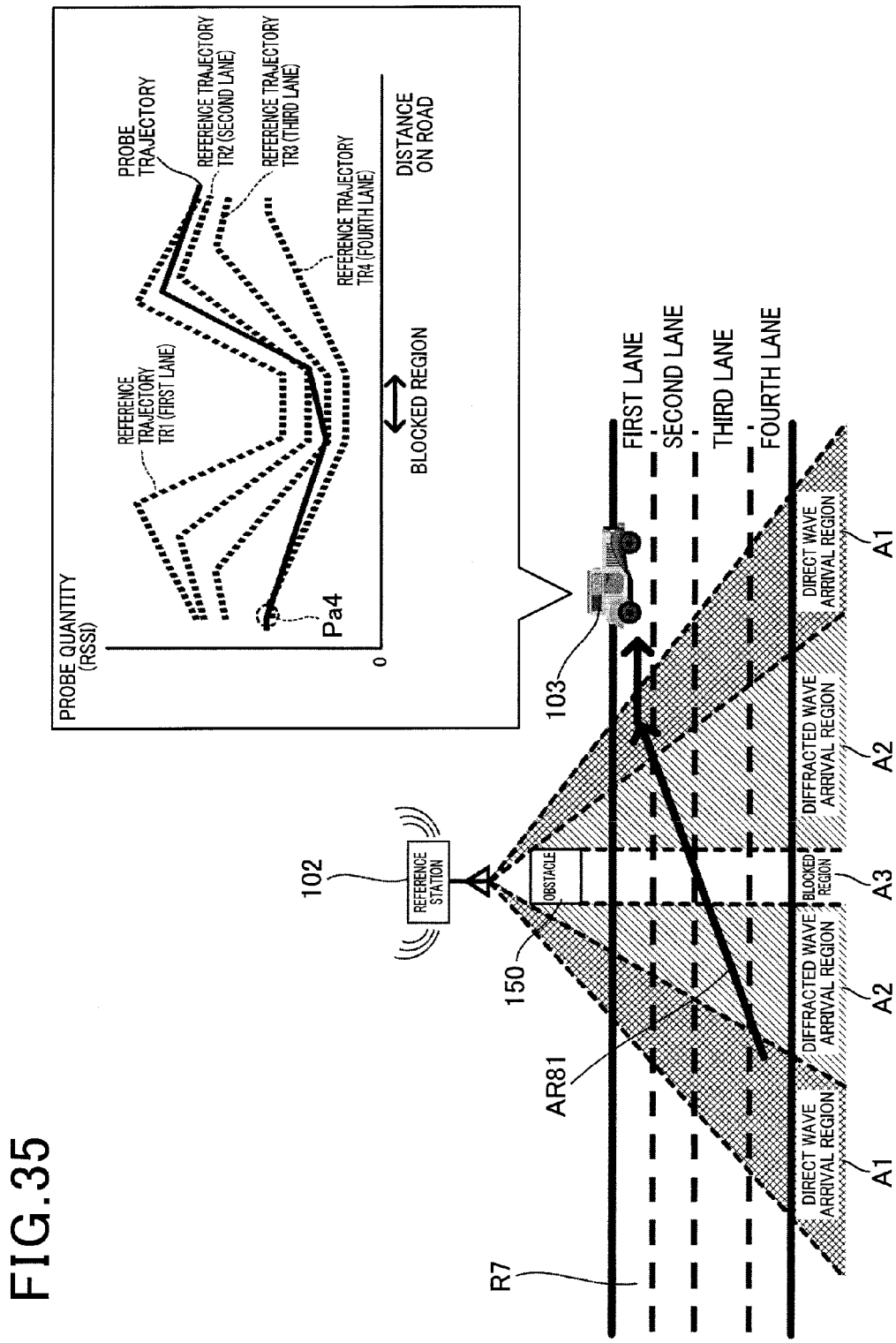
FIG. 35 is a diagram illustrating a specific example of position estimation, according to another embodiment of the present invention.

For example, as shown in FIG. 35, a vehicle that installs the on-vehicle apparatus 103 may move from the fourth lane to the first lane (refer to the arrow AR81 in FIG. 35). In this case, first, since the bending point on the probe trajectory matches the bending point Pa4 of the reference trajectory TR4, the position on the fourth lane of the vehicle that installs the on-vehicle apparatus 103 may be estimated. After that, comparing the probe quantity of the probe trajectory with the probe quantities of the reference trajectories TR1, TR2, TR3 and TR4, the path of movement from the fourth to first lanes can be estimated.

In the seventh embodiment, the weight coefficient in the case where the points on the reference trajectory TR1, TR2, TR3 or TR4 are included in the preferential area for matching is ensured to be larger than the weight coefficient in the case where the points are not included in the preferential area for matching. Alternative to this, the weight coefficient may be determined according the distance between the preferential area for matching and the current location of the vehicle. For example, the weight coefficient may be ensured to become smaller as this distance becomes longer.

In the seventh embodiment, a probe trajectory is compared with a reference trajectory using the inverse numbers of the probe quantity differences. Alternative to this, a probe trajectory may be compared with a reference trajectory using the distance between two bending points generated in the probe trajectory and the distance between two bending points generated in the reference trajectory (Refer to the arrow AR91 in FIG. 32. The arrow AR91 indicates the distance between the two bending points Pa1 on the reference trajectory TR1).

For example, in FIG. 32, the distance between the two bending points generated in the probe trajectory equals to the distance between the two bending points Pa1 on the reference trajectory TR1. Therefore, the vehicle that installs the on-vehicle apparatus 103 can be estimated to be travelling on the first lane.

While the invention has been particularly shown and described with reference to exemplary embodiments and modifications thereof, the invention is not limited to these embodiments and modifications. It will be understood by those of ordinary skill in the art that various changes in form and details may be made therein without departing from the spirit and scope of the present invention as defined by the claims.

What is claimed is:

1. A wireless communication apparatus, comprising:
    a wireless communicating unit that receives data transmitted from at least one wireless transmitter by direct wireless communication, the at least one wireless transmitter transmitting data in a wireless manner;
    a detecting unit that detects a wireless reception condition in the wireless communicating unit;
    a reference information storing unit that stores relation reference information that sets two or more relations between (i) the wireless reception condition in the wireless communicating unit on a reception of data transmitted from the wireless transmitter and (ii) location information relating to a location of the wireless transmitter;
    a distance measuring unit that measures relative distance information relating to a relative distance between the wireless transmitter and the wireless communication apparatus:
    a first generating unit that generates first relation information indicating a relation between a plurality of the wireless reception conditions detected by the detecting unit and a plurality of the relative distance information measured by the distance measuring unit;
    a relation determining unit that determines a relation between the location information and the relative distance information by comparing the relation reference information and the first relation information; and
    a position determining unit that determines a current location of the wireless communication apparatus on the basis of (a) the relation between the location information and the relative distance information determined by the relation determining unit and (b) a current wireless reception condition in the wireless communicating unit detected by the detecting unit.

2. The wireless communication apparatus according to claim 1, wherein:
    the wireless transmitter is provided to be fixed to a predetermined installation position;
    the location information in the relation reference information is information indicating a position on a road laid around the wireless transmitter; and
    the relative distance information in the first relation information is a travel distance of a vehicle provided with the wireless communication apparatus that moves on the road laid around the wireless transmitter.

3. The wireless communication apparatus according to claim 2, wherein:
    the relation reference information is set for each type of the vehicle.

4. The wireless communication apparatus according to claim 3, wherein:
    the road has a plurality of lanes each way; and
    the relation reference information is set for each lane of the road.

5. The wireless communication apparatus according to claim 4, further comprising:
    a first reference information acquiring unit that acquires the relation reference information transmitted from the wireless transmitter by using the wireless communication unit.

6. The wireless communication apparatus according to claim 5, further comprising:
    a first measurement information transmitting unit that transmits the first relation information generated in the first generating unit to the wireless transmitter by using the wireless communication unit.

7. The wireless communication apparatus according to claim 6, further comprising:
    a second reference information acquiring unit that acquires the relation reference information transmitted from a first management apparatus that is provided for each wireless transmitter to manage the relation reference information, by performing wireless communication with the first management apparatus via a wide-area wireless communication network.

8. The wireless communication apparatus according to claim 7, further comprising:
 a second measurement information transmitting unit that transmits the first relation information generated in the first generating unit to the first management apparatus by performing wireless communication via the wide-area wireless communication network.

9. The wireless communication apparatus according to claim 8, further comprising:
 a movement trajectory transmitting unit that transmits movement trajectory information indicating a movement trajectory of the wireless communication apparatus to the first management arrangement by performing wireless communication via the wide-area wireless communication network.

10. The wireless communication apparatus according to claim 9, wherein:
 the wireless transmitter includes a receiving function for receiving current location information indicating a current location of the wireless communication apparatus by direct wireless communication, and a transmitting function for transmitting the received current location information by direct wireless communication; and
 the wireless communication apparatus further comprises a location information transmitting unit that transmits the current location information to the wireless transmitter.

11. The wireless communication apparatus according to claim 2, wherein:
 an obstacle is located between the wireless transmitter and a road laid around the wireless transmitter, the obstacle blocking a part of waves propagated from the wireless transmitter so as to transmit data; and
 the relation determining unit is configured to determine the relation by using a first comparison result in preference to a second comparison result in a comparison between the first relation reference information and the relation information,
 the first comparison result being a result of the comparison that is performed in a case where the location information in the relation reference information is included in a preferential area that is set in advance so as to include a boundary between a direct wave arrival region and a direct wave non-arrival region, where the direct wave arrival region is a region on the road at which direct waves arrive and the direct wave non-arrival region is a region on the road at which the direct waves do not arrive, the direct waves being the waves that arrive at the road from the wireless transmitter without being blocked by the obstacle, and
 the second comparison result being a result of the comparison that is performed in a case where the location information in the relation reference information is not included in the preferential area.

12. The wireless communication apparatus according to claim 11, wherein:
 the obstacle is provided to be fixed to the wireless transmitter.

13. The wireless communication apparatus according to claim 11, wherein:
 the waves are radio waves.

14. The wireless communication apparatus according to claim 11, wherein:
 the waves are light waves.

15. The wireless communication apparatus according to claim 11, wherein:
 the waves are sound waves.

16. The wireless communication apparatus according to claim 11, wherein:
 the relation determining unit is configured to:
 calculate a parameter that indicates a degree of matching between the wireless reception condition in the relation reference information and the wireless reception condition in the first relation information at a plurality of calculation positions indicated by the location information in the relation reference information;
 calculate a multiplied value by multiplying the parameter calculated for each calculation position with a weight coefficient that is predetermined based on the corresponding calculation position and is set in such a manner that a first weight coefficient is larger than a second weight coefficient, where the first weight coefficient is a weight coefficient in a case where the calculation position is included in the preferential area for matching, and the second weight coefficient is a weight coefficient in a case where the calculation position is not included in the preferential area for matching; and
 determine the relation by using the calculated multiplied value.

17. The wireless communication apparatus according to claim 1, wherein:
 the wireless transmitter is mounted in a first moving object that moves on a road;
 the location information in the relation reference information is information indicating a relative distance between the first moving object and the wireless communication apparatus; and
 the relative distance information in the first relation information is information indicating an increase and decrease in a relative distance between the first moving object and the wireless communication apparatus with respect to a reference relative distance that is a relative distance between the first moving object and the wireless communication apparatus at a predetermined time point.

18. The wireless communication apparatus according to claim 17, further comprising:
 a third reference information acquiring unit that acquires the relation reference information transmitted from a second management apparatus that manages the relation reference information, by performing wireless communication with the second management apparatus via a wide-area wireless communication network.

19. The wireless communication apparatus according to claim 18, wherein:
 the wireless communication apparatus is mounted in a second moving object that moves on a road;
 the second moving object is provided with a relative distance measurement apparatus that measures a relative distance to the first moving object traveling ahead of the second moving object; and
 the wireless communication apparatus further comprises:
 a second generating unit that generates a relation between the wireless reception condition detected by the detecting unit and information indicating the relative distance measured by the relative distance measuring apparatus; and
 a third measurement information transmitting unit that transmits the second relation information generated in the second generating unit to the second management apparatus by performing wireless communication via the wide-area wireless communication network.

20. A wireless positioning system, comprising:

at least one wireless transmitter that transmits data in a wireless manner; and a wireless communication apparatus, including:

> a wireless communicating unit that receives data transmitted from the at least one wireless transmitter by direct wireless communication;
>
> a detecting unit that detects a wireless reception condition in the wireless communicating unit;
>
> a reference information storing unit that stores relation reference information that sets two or more relations between (i) the wireless reception condition in the wireless communicating unit on a reception of data transmitted from the wireless transmitter and (ii) location information relating to a location of the wireless transmitter;
>
> a distance measuring unit that measures relative distance information relating to a relative distance between the wireless transmitter and the wireless communication apparatus:
>
> a first generating unit that generates first relation information indicating a relation between a plurality of the wireless reception conditions detected by the detecting unit and a plurality of the relative distance information measured by the distance measuring unit;
>
> a relation determining unit that determines a relation between the location information and the relative distance information by comparing the relation reference information and the first relation information; and
>
> a position determining unit that determines a current location of the wireless communication apparatus on the basis of (a) the relation between the location information and the relative distance information determined by the relation determining unit and (b) a current wireless reception condition in the wireless communicating unit detected by the detecting unit.

* * * * *